US011838588B2

United States Patent
Barkley et al.

(10) Patent No.: US 11,838,588 B2
(45) Date of Patent: Dec. 5, 2023

(54) PERFORMING TRICK PLAYS OF SEGMENTED VIDEO CONTENT

(71) Applicant: Comcast Cable Communications, LLC, Philadelphia, PA (US)

(72) Inventors: James Barkley, Dowingtown, PA (US); Fei Wan, Warrington, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/857,869

(22) Filed: Dec. 29, 2017

(65) Prior Publication Data

US 2019/0208271 A1  Jul. 4, 2019

(51) Int. Cl.
| | |
|---|---|
| *H04N 21/458* | (2011.01) |
| *H04N 21/845* | (2011.01) |
| *H04N 21/44* | (2011.01) |
| *H04N 21/6587* | (2011.01) |

(52) U.S. Cl.
CPC .......... *H04N 21/458* (2013.01); *H04N 21/44* (2013.01); *H04N 21/6587* (2013.01); *H04N 21/8456* (2013.01)

(58) Field of Classification Search
CPC .. H04N 21/458; H04N 21/44; H04N 21/2387; H04N 21/234; H04N 21/23424
See application file for complete search history.

(56) References Cited

U.S. PATENT DOCUMENTS

| | | | | |
|---|---|---|---|---|
| 6,065,050 | A * | 5/2000 | DeMoney | H04N 7/17318 348/E7.071 |
| 6,965,724 | B1 * | 11/2005 | Boccon-Gibod | H04N 5/783 386/344 |
| 7,711,242 | B2 * | 5/2010 | Im | H04N 21/4325 386/350 |
| 7,797,064 | B2 * | 9/2010 | Loomis | H04L 65/764 700/94 |
| 2005/0262257 | A1 * | 11/2005 | Major | H04N 21/25808 709/231 |
| 2008/0253406 | A1 | 10/2008 | Hasek | |
| 2009/0169181 | A1 | 7/2009 | Priyadarshi et al. | |
| 2010/0195974 | A1 * | 8/2010 | Zheng | H04N 21/6587 386/343 |
| 2011/0035507 | A1 * | 2/2011 | Brueck | H04L 65/1101 709/231 |
| 2011/0116772 | A1 | 5/2011 | Kwon et al. | |
| 2011/0271092 | A1 * | 11/2011 | Brelay | G11B 27/005 713/150 |
| 2012/0210216 | A1 * | 8/2012 | Hurst | H04N 21/23439 715/716 |
| 2014/0003516 | A1 | 1/2014 | Soroushian | |
| 2014/0181667 | A1 | 6/2014 | Chen et al. | |

(Continued)

*Primary Examiner* — James R Sheleheda
(74) *Attorney, Agent, or Firm* — Banner & Witcoff, Ltd.

(57) ABSTRACT

Methods, systems, and apparatuses are described for performing trick plays of segmented video content are provided. A point at which a trick play begins may be based on a playback time associated with a video segment that includes the video frame currently displayed when a request to start the trick play is received. A point at which to resume playback of the normal rate video content may be similarly based on a trick play playback time associated with a trick play video segment that includes the trick play video frame currently outputted when a request to stop the trick play is received.

21 Claims, 11 Drawing Sheets

(56) References Cited

U.S. PATENT DOCUMENTS

| | | |
|---|---|---|
| 2015/0281310 A1 | 10/2015 | Ziskind et al. |
| 2015/0373383 A1 | 12/2015 | Pichumani et al. |
| 2016/0323653 A1 | 11/2016 | Chen et al. |
| 2017/0347135 A1* | 11/2017 | Frantz ................ H04N 21/6587 |
| 2018/0220153 A1* | 8/2018 | Braness ............... H04N 19/593 |

* cited by examiner

1x Normal Speed Playback

8x Fast-Forward Trick Play

8x Fast-Forward Trick Play

1x Normal Speed Playback

1x Normal Speed Playback

8x Rewind Trick Play

PERFORMING TRICK PLAYS OF SEGMENTED VIDEO CONTENT

BACKGROUND

Video content may be transmitted in a variety of ways. One way involves digitizing the video content and transferring the digitized video content to a playback device in multiple packets using the Internet Protocol (IP). Video content provided using this technique is often referred to as IP video. Due to the separation of the playback device and the source of IP video, there is a cost in terms of time to deliver the IP video to the playback device. As a result, there are challenges to providing trick plays in the context of IP video.

SUMMARY

Systems, methods, and apparatuses are described for performing trick plays of segmented video content. A trick play may be performed by first identifying which video frame of segmented video content is currently outputted when a request to start a trick play is received. The video segment that includes that video frame may also identified, and a playback time associated with that video segment may be determined. The playback time may be mapped or converted to an equivalent or corresponding trick play playback time. A trick play video segment at which to begin the trick play may be determined based on the corresponding trick play playback time. The trick play may begin at the trick play video segment determined. A trick play playback time may be determined based on the type of trick play requested, e.g., a fast-forward trick play or a rewind trick play.

This summary is not intended to identify critical or essential features of the disclosures herein, but instead merely summarizes certain features and variations thereof. Additional features associated with performing trick plays of segmented video content will be appreciated upon review of the additional disclosures set forth in further detail below.

BRIEF DESCRIPTION OF THE DRAWINGS

Some features described herein are provided by way of example, and not by way of limitation, in the figures of the accompanying drawings and in which like reference numerals refer to similar elements.

DETAILED DESCRIPTION

Methods, systems, and apparatuses for performing trick plays of segmented video content are disclosed. By employing the operations described herein a smooth visual experience may be achieved during playback of the trick play. The number of requests that may be needed to obtain the trick play segments for playback may be the same as the number of requests that may be needed to obtain the normal rate segments for playback. As a result, system performance may be maintained regardless of whether a user has selected the normal rate video content or the trick play video content for playback. Additional benefits and advantages of performing trick plays of segmented video content will be appreciated upon review of the disclosures below.

Figure 1:
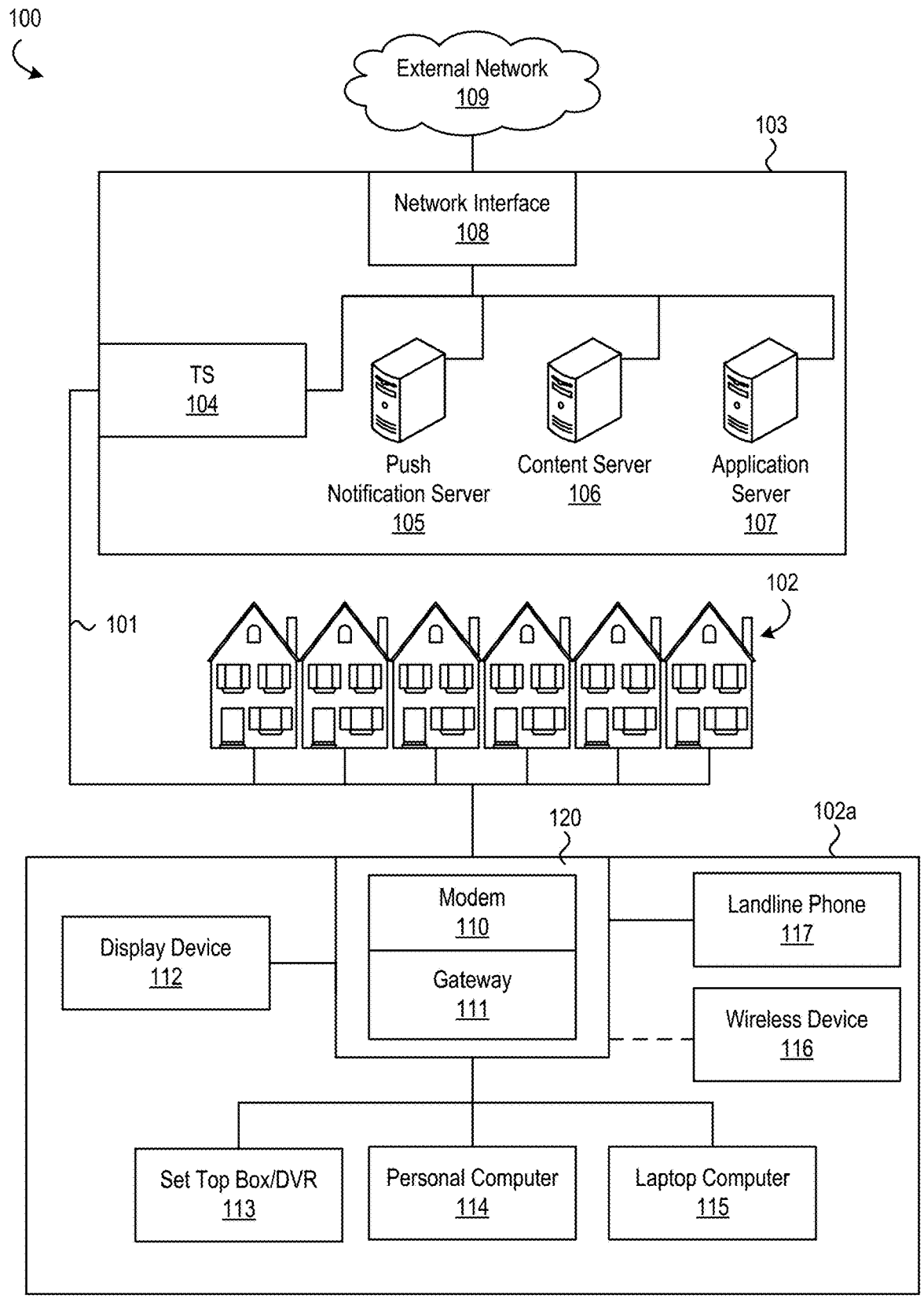
FIG. 1 shows an example of a communication network.

FIG. 1 shows an example of a communication network 100 on which one or more features described herein may be implemented. The network 100 may be any type of information distribution network, such as satellite, telephone, cellular, wireless, etc. One example may be an optical fiber network, a coaxial cable network, and/or a hybrid fiber/coax distribution network. The network 100 also may include multiple types of networks (e.g., Wi-Fi 802.11a-n, Ethernet, 3G, 4G, and 4GLTE) that interconnect. Such networks 100 use a series of interconnected communication links 101 (e.g., coaxial cables, optical fibers, wireless, etc.) to connect multiple premises 102 (e.g., businesses, homes, consumer dwellings, etc.) to a local office or head end 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not shown, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS). More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the DOCSIS standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which may permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Still another application server 107 may be responsible for tracking and collecting billing data associated with various equipment at the premises 102. Although shown separately, one of ordinary skill in the art will appreciate that the push notification server 105, content server 106, and application server 107 may be combined. Further, here the push notification server 105, content server 106, and application server 107 are shown generally, and it will be understood that they may each contain computer memory storing computer-executable instructions to cause a processor to perform steps described herein and/or memory for storing data.

An example premise 102*a*, such as a home, may include an interface 120. The interface 120 may include any communication circuitry that may be needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway device 111, such as a gateway interface device. The modem 110 may be connected to, or be a part of, the gateway device 111. The gateway device 111 may be a computing device that communicates with the modem(s) 110 to allow one or more other devices in the premises 102*a* to communicate with the local office 103 and other devices beyond the local office 103. The gateway device 111 may be a set-top box (STB), digital video recorder (DVR), computer server, or any other desired computing device. The gateway device 111 may also include (not shown) local network interfaces to provide communication signals to requesting entities/devices in the premises 102*a*, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
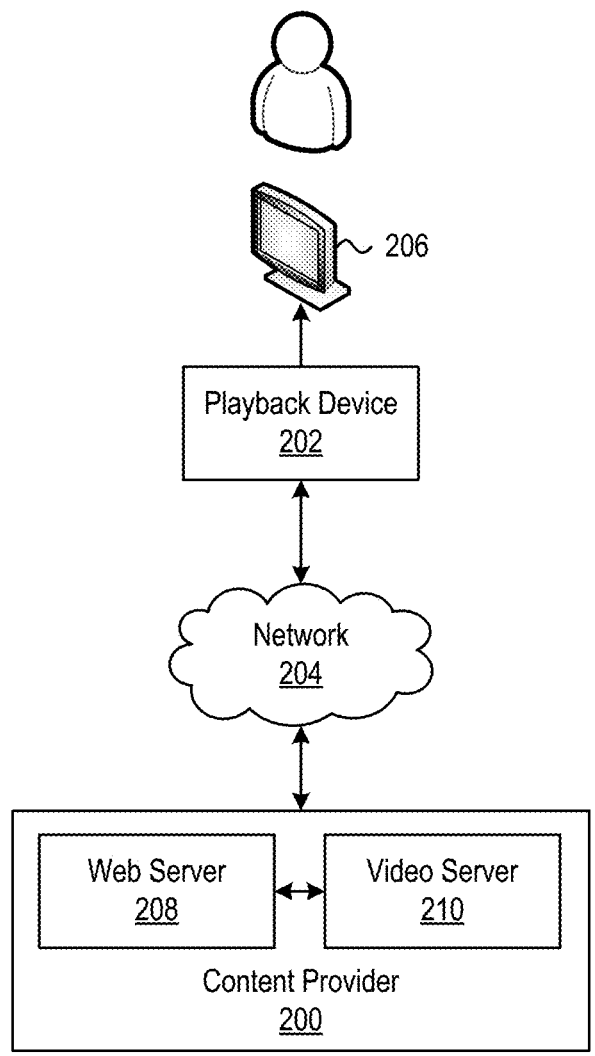
FIG. 2 shows an example configuration of a system for providing trick plays of segmented video content.

FIG. 2 shows an example configuration of a system for performing trick plays of segmented video content. As shown in FIG. 2, a content provider system 200 may be in signal communication with a playback devices 202 via a network 204. The playback device 202 may be connected to a respective display device 206. The content provider system 200, in this example, provides segmented video content to the playback device 202 via the network 204. Although only one playback device 202 is shown in FIG. 2, the content provider system 200 may be in signal communication with multiple playback devices and likewise provide segmented video content to those playback devices via the network 204.

The content provider system 200, in this example, includes a web server 208 and a video server 210. The web server 208 may be configured to handle and process the requests from the playback device 202. Such requests may include, for example, requests for a current playlist from the video server 210 as well as requests for the video fragments currently available from the video server. The web server 208 may forward the requests received from the playback device 202 to the video server 210 and receive, from the video server, the playlist or the video fragments requested. The web server 208 may package the playlist or video fragments requested in a response that is delivered to the playback device 202 via the network 204. Although FIG. 2 depicts the web server 208 and the video server 210 as separate components of the content provider system 200, a single device may include both a web server and a video server.

The network 204 may include a content delivery network that includes one or more features of the communication network 100 described above with reference to FIG. 1 to deliver content from a local office (e.g., local office 103) to the playback device 202. The network 204 may also include a wide area network (WAN) such as the Internet and utilize various Internet-related protocols for delivering segmented video content to the playback device 202. For example, the web server 208 may utilize HTTP (HyperText Transfer Protocol) to transmit segmented video content from the video server 210 to the playback device 202. The network 204 may also include a cellular network that uses cellular communication technologies to deliver segmented video content from the video server 210 to the playback device 202.

The playback device 202 may be any type of device configured to receive segmented video content, generate a video signal based on the segmented video content received, and output the video signal generated to a display device, e.g., the display device 206. The playback device 202 may be the same as or at least similar to the various devices residing at the premise 102a discussed above with reference to FIG. 1, e.g., the gateway device 111, STB or DVR 113, personal computer 114, and laptop computer 115. More generally, examples of playback devices include set-top boxes, digital video recorders, personal computers, desktop computing devices, laptop computing devices, tablet computing devices, hand-hand computing devices, mobile telephones, video game machines, virtual reality headsets, "smart" televisions, IPTV receivers, portable media players, console media players, dongles, microconsoles, information appliances, video graphics cards, and other types of devices configured to generate a video signal based on segmented video content received.

A playback device may receive content via a wired or wireless connection. For example, a coaxial cable may provide the video content to a modem, and a playback device may be connected to the modem. A playback device may be connected to the modem directly via an Ethernet connection or indirectly via a network router that is connected to the modem. The playback device may be connected to the network router via a wired connection (e.g., via an Ethernet connection) or via a wireless connection (e.g., via an 802.11 wireless communication session). The coaxial cable may also provide the video content directly to the playback device.

The display device 206 may be any type of device configured to receive a video signal and output visual images corresponding to that video signal. The display device 206 may be the same as or similar to the display device 112 discussed above with reference to FIG. 1. More generally, examples of display devices include televisions, computer monitors, computer screens, touchscreens, video projectors, heads-up displays, head-mounted displays, digital billboards, and other types of devices configured to generate visual images from a video signal received.

Although the playback device 202 is shown to be separate from its respective display device 206, this need not be the case. A single device may incorporate both the playback device and the display device. Examples of devices that include both the playback device and the display device include mobile telephones (e.g., "smartphones"), tablet computing devices, laptop computing devices, desktop computing devices, and other types of devices configured to receive the segmented video content, generate a video signal based on the segmented video content received, and output visual images corresponding to that video signal.

Figure 3:
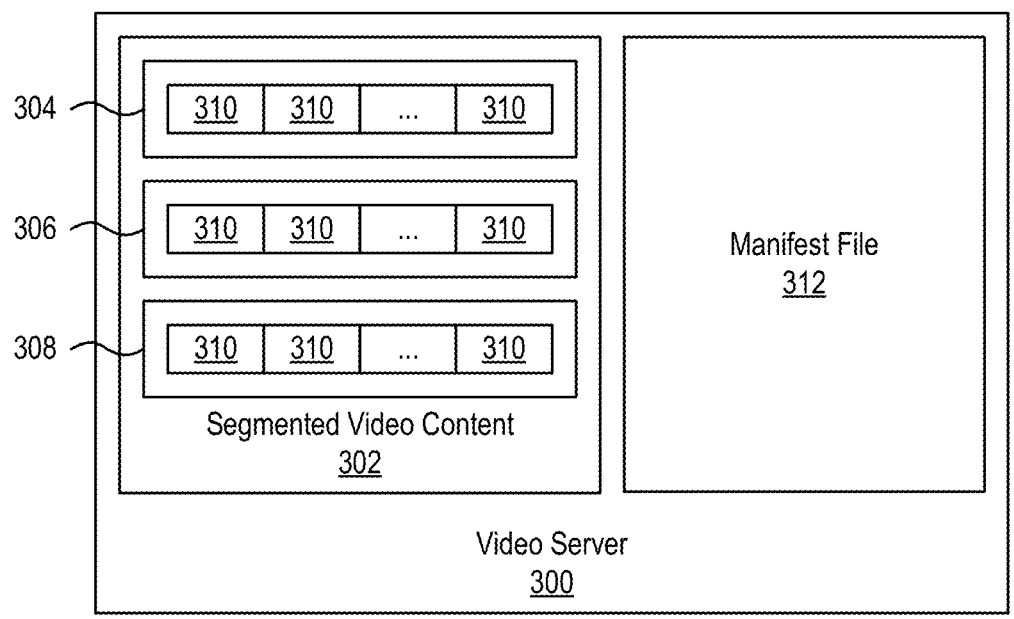
FIG. 3 shows an example of a video server.

FIG. 3 shows an example of a video server 300. The video server 300 may be, for example, the video server 210 discussed above with reference to FIG. 2. The video server 300 may be a type of content provider configured to provide video content 302 to playback devices. In this example, the video content 302 is segmented video content that includes a collection of video segments each having multiple video frames. The collection of video segments may be organized and stored as one or more video files on the video server 300. The video files may include respective video files used for normal rate playback and trick play playback at a playback device. As shown in FIG. 3, for example, the video content 302 may include a video file 304 intended for normal rate playback and video files 306 and 308 intended for trick play playback. As also shown in FIG. 3, each video file 304-308 may include a collection of video segments 310 which will be discussed in further detail below. The video server 300, in this example, also stores a manifest file 312 indicating the video files 304-308 and the corresponding video segments 310 that are available for the video content 302. The video file 306, in this example, is intended for a fast-forward trick play, and the video file 308, in this example, is intended for a rewind trick play. For convenience, the video file 304 intended for normal rate playback may be referred to herein as a "normal rate video file." Also for convenience, the video file 306 intended for a fast-forward trick play may be referred to herein as a "fast-forward trick play video file" (or an "FF trick play video file"), and the video file 308 intended for a rewind trick play is referred to herein as a "rewind trick play video file" (or an "REW trick play video file"). Collectively, video files intended for trick play playback (e.g., the fast-forward trick play file 306 and the rewind trick play file 308) may be referred to herein as "trick play video files."

A trick play may involve a playback rate that is relatively faster or slower than the playback rate of the normal rate video file 304. The following terminology is used herein for convenience in order to denote the playback rates of segmented video content. For convenience, a normal playback rate of the video content 302 may be denoted herein as "1×." Also for convenience, a playback rate that is twice as fast or twice as slow as the normal playback rate may be denoted herein as "2×." By extension, playback rates four times, eight times, sixteen times, etc., as fast or as slow as the normal playback rate may be denoted herein as "4×," "8×," and "16×," respectively. A fast-forward ("FF") trick play providing trick play video content eight times as fast as the normal rate video content may be described as an "8× FF trick play." A rewind ("REW") trick play providing trick play video content twice as fast as the normal rate video content may be described as a "2×REW trick play." A REW trick play providing trick play video content half as fast as (i.e., slower than) the normal playback rate may be described as a "0.5×REW trick play." Additional and alternative examples will be appreciated with the benefit of this disclosure. The playback rate of a trick play may also be referred to as a trick play speed.

The normal rate video file 304 and the trick play video file 306 and 308 may also be characterized in terms of their playback timelines. A playback timeline may provide an indication of the duration of the video content and may be used to indicate the current playback position of the video content. Once again for convenience, a playback timestamp—e.g., "HH:mm:ss"—is used herein to denote playback positions on the playback timeline, where "HH" indicates the number of hours that have elapsed on the playback timeline since playback began, "mm" indicates the number of minutes that have elapsed on the playback timeline since playback began, and "ss" indicates the number of seconds that have elapsed on the playback timeline since playback began. A user may selectively adjust the current playback position on the playback timeline by requesting FF and/or REW trick plays. A playback timestamp of 00:00:00 may be used to indicate the starting point of a playback timeline. The ending point of a playback timeline would correspond to the duration of the video content. Video content one hour and thirty minutes in duration may have a playback timeline extending from 00:00:00 to 01:30:00 and may be characterized by a playback timestamp of "00:00:00" indicating its starting point, by a playback timestamp of "01:30:00" indicating its ending point, and by a playback timestamp of "00:45:00" indicating its halfway point. Playback time intervals are denoted herein as $HH_s:mm_s:ss_s$-$HH_e:mm_e:ss_e$ in which $HH_s:mm_s:ss_s$ is the starting playback time for the playback interval and $HH_e:mm_e:ss_e$ is the ending playback time for the playback interval. For convenience, the playback intervals denoted herein are half-open intervals insofar as they include their starting endpoints, but do not include their ending endpoints. Using standard interval notation, the playback intervals may also be denoted as $HH_s:mm_s:ss_s$, $HH_e:mm_e:ss_e$)—i.e., a left-closed, right-open interval—and in which a particular playback time, pt, within this interval may be described as $HH_s:mm_s:ss_s \leq pt < HH_e:mm_e:ss_e$.

The video content 302 discussed herein may be segmented video content. The normal rate video file 304 and its trick play video files 306-308 may be segmented into multiple video segments 310. Each of the video segments 310, in this example, include a sequence of video frames (see, e.g., FIGS. 5A-B and 6A-B). The number of video frames in a video segment may vary. For example, video content intended for normal rate playback (e.g., the video file 304) may have a framerate of 30 frames per second (fps) and be segmented into segments having a duration of 2 seconds (s). This type of video segment has 60 total frames (i.e., 30 frames/second×2.0 seconds=60 frames). Additionally or alternatively, video segments may have a duration of, e.g., 10 s or 12 s, and each include more or fewer video frames. Each video frame of a video segment may be at the same resolution and aspect ratio. Various resolutions and aspect ratios may be selectively employed for the segmented video content 302. The video server 300 may provide multiple versions of the video content 302 in which the segment duration, resolution, and/or aspect ratio varies across the different versions of the video content. The video frames of a video segment may be quantized in order to compress the size of the video frames.

Although the video server 300 in FIG. 3 is depicted as having only a single FF trick play video file 306 and a single REW trick play video file 308, the video server may provide multiple FF and REW trick play video files. For example, the video server 300 may also provide one or more of a 2× FF trick play video file, a 4× FF trick play video file, an 8× FF trick play video file, a 16× FF trick play video file, and so forth. The video server 300 may also provide one or more of a 2×REW trick play video file, a 4×REW trick play video file, an 8×REW trick play video file, a 16×REW trick play video file, and so forth. Additional and alternative examples will be appreciated with the benefit of this disclosure.

The video server 300 may also provide multiple versions of the video content 302. The different versions of the video content 302 may include, for example, versions of the video content that have been encoded at different bit rates. For example, the video server 300 may provide "high," "medium," and "low" quality versions of the video content 302 encoded at relatively higher or lower bit rates. The particular version of the video content received by a playback device may depend on the quality of the network connection between the video server and the playback device (e.g., based on the amount of available bandwidth, network latency, etc.) and/or the processing capacity at the playback device. For example, as the quality of the network connection diminishes, the video server 300 may adapt by switching from transmitting the "high" quality version of the video content to transmitting the "medium" quality or "low" quality version of the video content. As the quality of the network connection improves, the video server 300 may again adapt by switching back to transmitting a higher quality version of the video content, e.g., the "high" quality or "medium" quality version of the video content. Such operations may be employed, for example, during adaptive streaming of the video content 302 to a playback device. There are different ways to provide adaptive bitrate streaming, e.g., using HTTP. For example, the video server 300 may provide multiple versions of its normal rate video file—e.g., "high," "medium," and "low" quality versions of the normal rate video file 304—as well as multiple versions of its trick play video files—e.g., "high," "medium," and "low" quality versions of its FF trick play video file 306 and its REW trick play video file 308, respectively. Similarly, the video server 300 may provide multiple versions of its trick play files at particular playback rates and having different bitrate encodings—e.g., "high," "medium," and "low" quality versions of each of its 2×, 4×, 8×, and/or 16× FF trick play video files and/or REW trick play video files.

The video server 300 may store the video files of the video content 302 and/or generate the video content 302 dynamically. For example, the video server 300 may only store a master video file for each of its normal rate video files and trick play video files. The video server 300 may employ an encoder to encode the video content 302 at multiple bitrates—e.g., a relatively high bitrate, a relatively low bitrate, and an intermediary bit rate—to respectively generate the "high," "low," and "medium" quality versions of the video content which, as discussed above, may be transmitted (e.g., streamed) to a playback device in an adaptive fashion. Additionally or alternatively, video server 300 may persistently store the multiple versions of its normal rate video file and trick play video files.

The video server 300 may also store multiple manifest files. For example, the video server 300 may store a master manifest file that identifies each video file available for the video content 302. The master manifest file may indicate the normal rate video file and the trick play video files that are available for the video content and include an indication of a corresponding manifest file stored at the video server for each of the video files. A corresponding manifest file may indicate, for one of the video files, some or all of the video segments that are available for that video file. A uniform resource identifier (URI) such as a uniform resource locator (URL) may be employed to indicate the storage location at the video server 300 of the master manifest file, the individual manifest files corresponding to the video files, and the video segments of the video files. A single playlist (e.g., manifest file 312) may indicate the normal rate video file and the trick play video files that are available for the video content as well as the video segments that are available for each respective video file. A mark-up language such as the Extensible Markup Language (XML) may be employed to implement the manifest file 312. Additional and alternative data formats (e.g., JSON) may be selectively employed to implement a manifest file.

The video content 302 in FIG. 3 may correspond to a single item of video content, e.g., a movie, an episode of a television show, a video clip, and the like. The video server, however, may store multiple items of video content, e.g., multiple movies, multiple episodes of one or more television shows, multiple video clips, etc. The video server 300 may also store, for each item of video content, a corresponding manifest file as well as multiple versions of that item of video content as described above. The video content 302 may also be "live" video content ingested by the video server 300 in real-time (e.g., from a video broadcaster or other video content provider) and encoded in real-time for retransmission to a playback device.

The video server 300 may receive a selection of an item of video content (e.g., video content 302) from a playback device. The video server may retrieve the manifest file (e.g., manifest file 312) corresponding to the selected video content and provide the manifest file to the playback device. The playback device may read the manifest file to determine what video files are available for the selected video content as well as what video segments are available for a desired video file. The playback device may then transmit a request for one or more video segments of the desired video file, and the video server 300 may respond by transmitting the requested video segments to the playback device. As noted, a playback device may adapt to changing network or processing conditions by selectively requesting video segments from one of the "high," "medium," or "low" quality versions of the video content undergoing playback.

Figure 4:
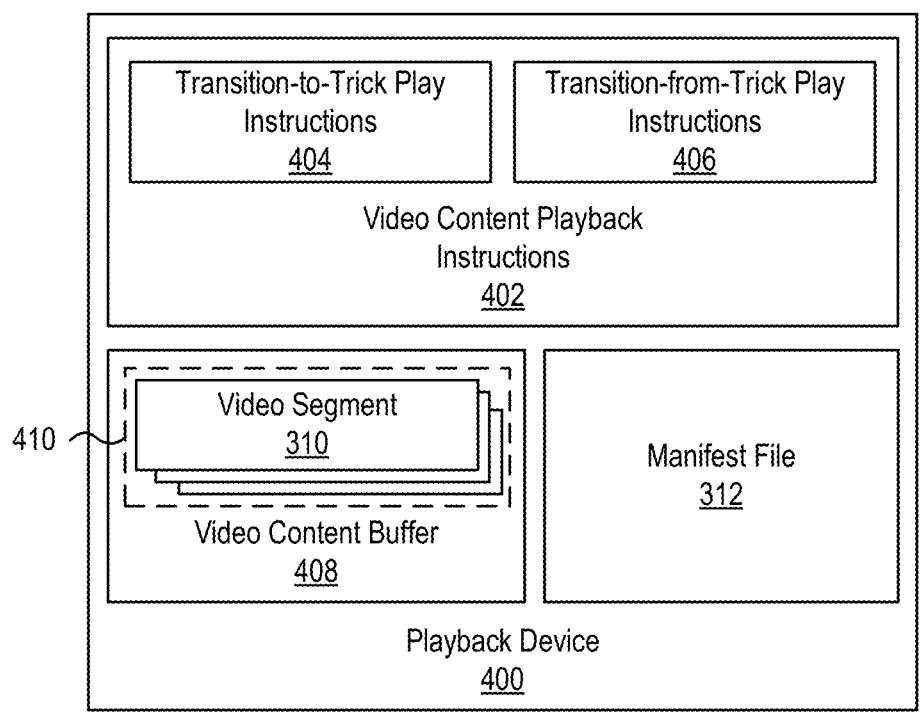
FIG. 4 shows an example of a playback device.

FIG. 4 shows an example of a playback device 400. The playback device 400 may be, for example, the playback device 202 discussed above with reference to FIG. 2. The playback device 400 may be configured to transition from normal playback (e.g., 1× playback) to a trick play (e.g., an 8× FF trick play) and to transition from a trick play back to normal playback. The playback device may store and execute the video content playback instructions 402. The video content playback instructions 402 may include multiple sets of instructions that, when executed by a processor of the playback device (not shown), may cause the playback device to perform various actions associated with video content playback. Such actions include transitioning between normal playback and trick plays for video content output by the playback device. Outputting video content, video segments, and/or video frames may take many forms. For example, such outputting may include displaying, sending for display, buffering in preparation for display, forwarding to an intermediate component on the way to being displayed, forwarding for recording, and the like. The video content playback instructions 402 may include a first set of instructions 404 that, when executed, may cause the playback device to transition from normal playback of video content to a trick play for the video content. For convenience, this first set of instructions 404 is referred to herein as "transition to trick play instructions." The video content playback instructions 402 may also include a second set of instructions 406 that, when executed, may cause the playback device to transition from a trick play for the video content to normal playback of the video content. Again for convenience, this second set of instructions 406 is referred to herein as "transition from trick play instructions."

For the sake of clarity, not all of the various sets of instructions included in the video content playback instructions 402 are depicted in FIG. 4. The video content playback instructions 402 may also include sets of instructions that, when executed, may cause the playback device to request a manifest file for an item of video content selected for playback, request video segments for video content undergoing playback, buffer video segments received, and the like. The playback device 400 may also store in a video content buffer 408 of a set 410 of video segments (e.g., video segments 310) received from a content provider (e.g., video server 300 in FIG. 3) as shown in FIG. 4. The playback device 400 may also store a manifest file (e.g., manifest file 312) received from the content provider.

Transitioning between normal playback of video content and a trick play of video content will now be described with reference to FIGS. 5A-B and 6A-B. The playback device 400 may carry out these transitions as described below by respectively executing the transition to trick play instructions 404 and the transition from trick play instructions 406. Simply to show examples of principles underlying transitions between normal playback and a trick play, the disclosures below are provided, without limitation, in the context of an 8× FF trick play (FIGS. 5A-B) and an 8×REW trick play (FIGS. 6A-B) for video content one hour and thirty minutes in duration (i.e., 00:01:30) that is segmented into 2 second segments at a normal playback rate of 30 fps. The operations discussed below may be similarly employed to transition between normal playback and alternative playback rates for trick plays (e.g., 2×, 4×, 16×, etc.) for segmented video content having alternative overall durations (e.g., thirty minutes, two hours, etc.), alternative segment durations (e.g., 10 s, 12 s, etc.), and alternative normal playback rates (e.g., 60 fps).

The structure of the segmented video content in this example may be as follows. To achieve trick plays at faster than normal playback rates, the trick play video files may include fewer video frames than the normal rate video file. For example, a 2× trick play video file would include two-times fewer (i.e., half as many) video frames as a normal rate video file, a 4× trick play video file would include four-times fewer video frames, a 8× trick play video file would include eight-times fewer video frames, a 16× trick play file would include sixteen-times fewer video frames, and so forth. As noted above, normal rate playback of the video content may occur at 30 fps using video segments having a 2 second duration. Accordingly, such a video segment would include 60 total frames (30 frames/s×2 s=60 frames).

The trick play video files corresponding to the normal rate video file may include a subset of the video frames of the normal rate video file. For example, a 2× trick play video file may include every other video frame of a corresponding normal rate video file (e.g., the $1^{st}$ video frame, the $3^{rd}$ video frame, and so forth), a 4× trick play video file may include every fourth video frame of the normal rate video file (e.g., the $1^{st}$ video frame, the $5^{th}$ video frame, and so forth), an 8× trick play video file may include every eighth video frame of the normal rate video file (e.g., the $1^{st}$ video frame, the $9^{th}$ video frame, and so forth), and a 16× trick play video file may include every sixteenth video frame of the normal rate video file (e.g., the $1^{st}$ video frame, the $17^{th}$ video frame, and so forth). Additional or alternative operations may be employed to select a subset of the video frames of the normal rate video file for a trick play file. For example, a trick play file may include consecutive sequences of video frames of the normal rate video file, e.g., a 4× trick play file with the $1^{st}$-$4^{th}$, $9^{th}$-$12^{th}$, $17^{th}$-$20^{th}$, etc., video frames from a normal rate video file. As another example, a trick play file may include a combination of individual video frames and consecutive sequences of video frames of the normal rate video file, e.g., a 4× trick play file with the $1^{st}$, $6^{th}$-$9^{th}$, $14^{th}$, $19^{th}$-$22^{nd}$, etc., video frames from a normal rate video file. Additional and alternative examples for structuring a trick play file using a subset of video frames from a normal rate video file will be appreciated with the benefit of this disclosure.

Performing trick plays of segmented video content may employ video segments of the same duration (e.g., 2 s) for both the normal rate video content and the trick play video content. The number of requests for video segments may remain the same when transitioning between playback of the normal rate video content and the trick play video content. As noted, a playback device may obtain video segments from a content provider using a request/response approach. Given two-second segments, a request for a new segment occurs every two seconds in this example. Since both the normal rate video content and the trick play video content include video segments two seconds in duration, the number of requests for video segments may remain the same (e.g., every 2 s) regardless of whether the user has selected the normal rate video content or the corresponding trick play video content for playback. As noted, however, the trick play video content may include fewer total video frames than the normal rate video content and fewer total video segments. For example, a 2× trick play video file may include half as many video segments as a normal rate video file, a 4× trick play video file may include four-times fewer video segments, a 8× trick play video file would include eight-times fewer video segments, a 16× trick play file may include sixteen-times fewer video segments, and so forth.

The two-second duration for the video segments of the trick play video content may be maintained by including fewer video frames in the video segments for the trick play video content and reducing the playback rate (e.g., the fps) of those video segments during playback of the trick play video content. For example, 2 second video segments for 8× trick play video content may include sixteen video frames and limited to output at 8 fps (16 video frames÷8 frames/s=2 s). Accordingly, the playback time of each trick play video segment would be the same as that of a normal rate video segment (e.g., 2 s), but correspond to a longer duration on the normal rate playback timeline. For example, consider a 2 second normal rate video segment corresponding to 00:30:00-00:30:02 on the normal rate playback timeline (i.e., second 1,800-1,802 corresponding to the $901^{st}$ normal rate video segment). A 2 second 8× trick play video segment would likewise correspond to two seconds on a trick play playback timeline—i.e., 00:03:45-00:03:47 (the $113^{th}$ 8× trick play video segment)—but correspond to sixteen seconds on the normal rate playback timeline—i.e., 00:30:00-00:30:16. The mapping between the normal rate playback timeline and trick play timelines is discussed in further detail below.

FIGS. 5A-B and 6A-B show examples of segmented video content that is one hour and thirty minutes in duration when output at a normal playback rate, in other words, having a normal rate playback timeline of 00:00:00-01:30:00. The trick plays are discussed in the context of example video segments that are two seconds in duration. The trick plays discussed in this example are 8× trick plays—an 8× FF trick play for FIGS. 5A-B and an 8×REW trick play for FIGS. 6A-B. The normal rate video file for this example segmented video content that is 01:30:00 in duration that uses 2 second segments would include 2,700 total video segments (01:30:00=5,400 s; 5,400 s÷2 s/segment=2,700 segments). The video segments may be enumerated for reference, e.g., the $1^{st}$ segment, the $2^{nd}$ segment, the $2,700^{th}$ segment, and so forth. At 2 seconds per video segment, the $1^{st}$ normal rate video segment corresponds to 00:00:00-00:00:02 on the normal rate playback timeline, the $2^{nd}$ normal rate video segment corresponds to 00:00:02-00:00:04 on the normal rate playback timeline, and the $2,700^{th}$ normal rate video segment (i.e., the last normal rate video segment) corresponds to 01:29:58-01:30:00 on the normal rate playback timeline. The corresponding 8× trick play video files for these example trick plays would include 338 total segments (01:30:00=5,400 s; 5,400 s÷8=675 s; 675 s÷2 s/segment=337.5 segments; [337.5 segments]=338 segments, i.e., the ceiling of 337.5 segments). Again at 2 seconds per video segment, the $1^{st}$ trick play video segment corresponds to 00:00:00-00:00:02 on the trick play playback timeline and the $338^{th}$ trick play video segment (i.e., the last trick play video segment) corresponds to 00:11:14-00:11:16 on the trick play playback timeline (i.e., seconds 674-676). Depending on the total duration of the normal rate video content or the trick play video content, the last video segment may not include video frames for each of its two seconds, or the video segment may be padded with video frames as needed to yield a 2 second duration.

The following notation is used in FIGS. 5A-B and FIGS. 6A-B. The playback time for the playback timeline of the segmented video content is denoted pt. The starting playback time, the ending playback time, and the current playback time on a playback timeline are denoted s, e, and c, respectively. The playback rate of the segmented video content is denoted R which may be 1× for normal rate playback as well as 2×, 4×, 8×, and 16× for respective trick plays. The type of trick play is denoted using FF for a fast-forward trick play and REW for a rewind trick play. A video segment for the segmented video content is denoted by its segment number, n, and, if applicable, the type of trick play and the corresponding trick play playback rate. Each video frame of a video segment is associated with a presentation time. In this regard, for normal rate video content, $pt_{1\times\_s}$ denotes its starting playback time, $pt_{1\times\_e}$ denotes its ending playback time, and $pt_{1\times\_c}$ denotes its current playback time. Similarly, $8\times\_FF\_segment_n$ denotes the $n^{th}$ segment of 8× FF trick play video content. The playback time associated with a video frame may be used to determine the trick play video segment at which to begin playback of a trick play. The playback time for a video frame of a segment is denoted $pt_{f,seg}$, where f is video frame number and seg is the segment number containing the video frame. For example, the playback time associated with the $30^{th}$ video frame of the $100^{th}$ video segment is denoted $pt_{30,100}$, and the playback time associated with the $1^{st}$ video frame through the $60^{th}$ video frame of the $100^{th}$ video segment is denoted $pt_{1-60,100}$.

Figure 5A:
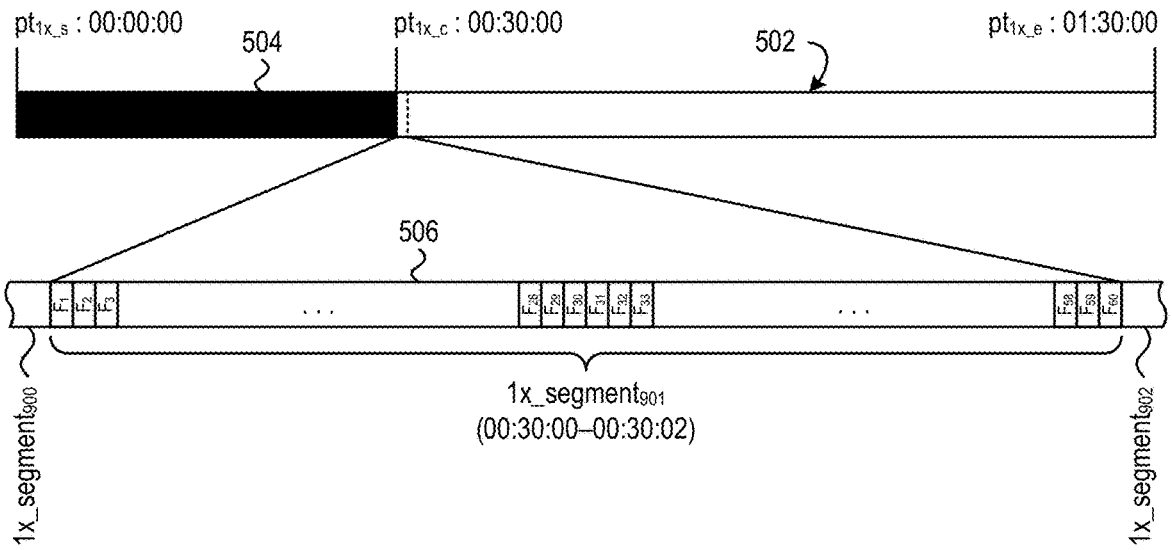
FIG. 5A shows example fast-forward trick play video content and normal speed content prior to a fast-forward trick play.
Figure 5A:
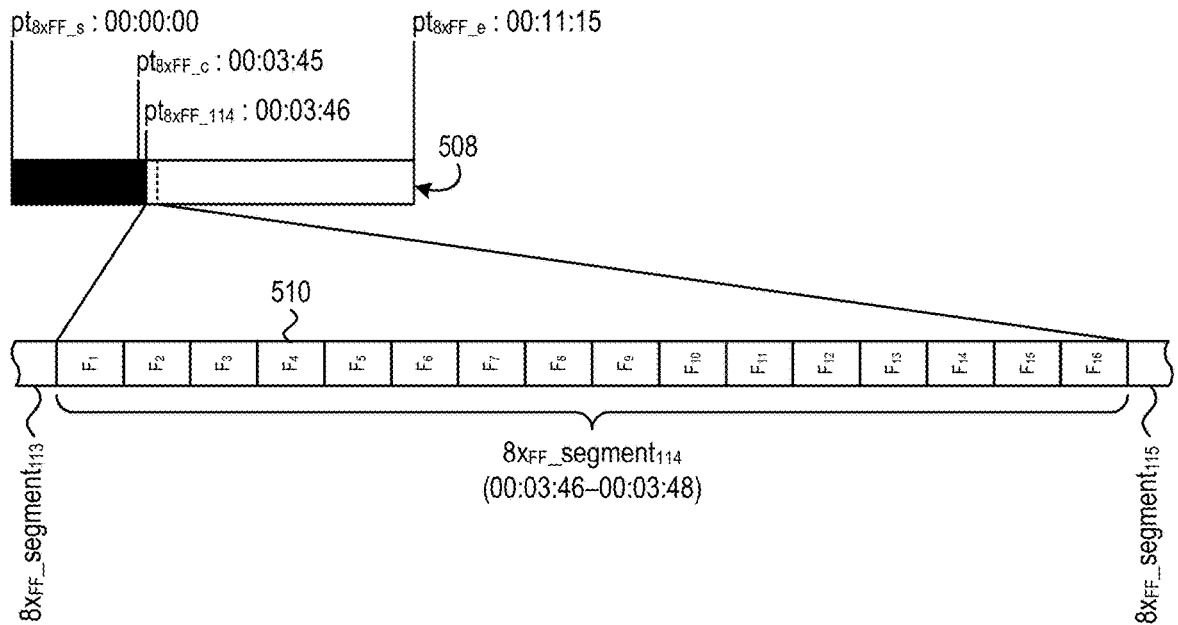

In FIG. 5A, the playback timelines and corresponding video segments when transitioning from normal rate playback to an 8× FF trick play are shown. A playback device may determine where to begin playback of the 8× FF trick play by determining a normal rate playback time, $pt_{f,seg}$, associated with the currently outputted video frame of the current normal rate video segment. Based on this normal rate playback time, the playback device may select a trick play video segment at which to begin playback of the 8× FF trick play. The playback device may map the determined normal rate playback time, $pt_{f,seg}$, on the normal rate playback timeline to a corresponding trick play playback time on the FF trick play playback timeline. The playback device may request, from the content provider, the trick play video segment associated with that corresponding trick play playback time and outputs the trick play video segment received. The playback device may continue to request the subsequent trick play video segments of the 8× FF trick play until the user stops the trick play (or until the trick play timeline expires) at which point the playback device may transition back to normal rate playback to output the normal rate video content.

As shown in FIG. 5A, the normal rate playback timeline 502 is one hour and thirty minutes in duration, i.e., $pt_{1\times\_s}$=00:00:00 and $pt_{1\times\_e}$=01:30:00. As also shown in FIG. 5A, thirty minutes have elapsed on the normal rate playback timeline 502, i.e., $pt_{1\times\_c}$=00:30:00, as indicated by the shaded portion 504 of the timeline. Accordingly, normal rate video segment 506 corresponds to a normal rate playback time, $pt_{1\times\_c}$. The normal rate video segment 506, in this example, includes sixty total video frames, enumerated $F_1$-$F_{60}$, and corresponds to 00:30:00-00:30:02 on the normal rate playback timeline 502 which, in turn, corresponds to the $901^{st}$ video segment of the normal rate video content.

The normal rate playback time, $pt_{f,seg}$, associated with the video frames of a normal rate video segment may be determined in different ways. For example, the normal rate playback time associated with all video frames may be the playback time on the playback timeline at the start of the video segment. With reference to FIG. 5A, for example, the playback time associated with the video frames, $F_1$-$F_{60}$, of the video segment 506 may be be 00:30:00, i.e., the playback time on the playback timeline 502 at the start of the $901^{st}$ video segment. Additionally or alternatively, the playback time associated with the first half of the video frames may be the current normal rate playback time at the start of the video segment, and the playback time associated with the second half of the video frames may be the current normal rate playback time at the end of the video segment. Again with reference to FIG. 5A as an example, the normal rate playback time associated with the first half of the video frames, $F_1$-$F_{30}$, of the video segment 506 may be 00:30:00—i.e., the playback time on the playback timeline 502 at the start of the $901^{st}$ video segment—and the playback time associated with the second half of the video frames, F31-F60, of the video segment 506 may be 00:30:02—i.e., the playback time on the playback timeline 502 at the end of the $901^{st}$ video segment. Additionally or alternatively, the playback time associated with an initial set of video frames may be the current normal rate playback time at the start of the video segment, the playback time associated with a middle set of video frames may be the current normal rate playback time halfway through playback of the video segment, and the playback time associated with an final set of video frames may be the current normal rate playback time at the end of the video segment. Once more with reference to FIG. 5A, the playback time associated with an initial set of the video frames, $F_1$-$F_{15}$, of the video segment 506 may be 00:30:00; the playback time associated with a middle set of the video frames, $F_{16}$-$F_{45}$, of the video segment 506 may be 00:30:01; and the playback time associated with a final set of video frames, $F_{46}$-$F_{60}$, of the video segment 506 may be 00:30:02. Additional and alternative examples will be appreciated with the benefit of this disclosure. For the sake of convenience and by way of example only, the starting time of a video segment (e.g., 00:30:00 for video segment 506) is used as the playback time associated with the video frames of the normal rate segment in the present example.

The playback device may determine the normal rate playback time, $pt_{f,seg}$, associated with the currently outputted video frame of the current normal rate video segment and map the determined normal rate playback time to a corresponding trick play playback time, $pt_{R\_FF\_c}$, on the FF trick play playback timeline in order to determine at which trick play video segment it should begin playback of the FF trick play. To determine the corresponding trick play playback time, $pt_{R\_FF\_c}$, the normal rate playback time associated with the currently outputted normal rate video frame, $pt_{f,seg}$, may be divided by the trick play playback rate, R ($pt_{R\_FF\_c} = pt_{f,seg} \div R$). The playback device may determine at which trick play video segment to begin playback of the FF trick play based on the corresponding trick play playback time, $pt_{R\_FF\_c}$. The playback device may begin playback of the FF trick play at the first trick play video segment with a starting playback time on the FF trick play playback timeline that is greater than or equal to the determined corresponding trick play playback time, $pt_{R\_FF\_c}$.

In FIG. 5A, the FF trick play is an 8× FF trick play. Accordingly, the FF trick play playback timeline 508 for the 8× FF trick play is one eighth the duration of the normal rate playback timeline 502, i.e., $pt_{8\times\_FF\_s}$=00:00:00 and $pt_{8\times\_FF\_e}$=00:11:15. The video segment 510 for the 8× FF trick play is also two seconds in duration but includes fewer video frames, $F_1$-$F_{16}$. In this example, $pt_{1\text{-}60,901}$=00:30:00—the playback time associated with the video frames, $F_1$-$F_{60}$, of the $901^{st}$ normal rate video segment 506. This normal rate playback time, $pt_{1\text{-}60,901}$, maps to a corresponding trick play playback time, $pt_{8\times\_FF\_c}$, of 00:03:45 ($pt_{1\text{-}60,901}$=00:30:00=1,800 s; 1,800 s÷8=225 s; 225 s=00:03:45). A 00:03:45 trick play playback time, $pt_{8\times\_FF\_c}$, corresponds to the $113^{th}$ video segment of the 8× FF trick play video content which, in turn, corresponds to 00:03:44-00:03:36 on the FF trick play playback timeline 508. Accordingly, the first trick play video segment having a starting playback time greater than or equal to the corresponding trick play playback time, $pt_{8\times\_FF\_c}$, of 00:03:45 is the $114^{th}$ trick play video segment which corresponds to 00:03:46-00:03:48 on the FF trick play playback timeline 508 with a starting playback time, $pt_{8\times\_FF\_114}$, of 00:03:46. The playback device may begin playback of the 8× FF trick play at its $114^{th}$ trick play video segment.

Figure 5B:
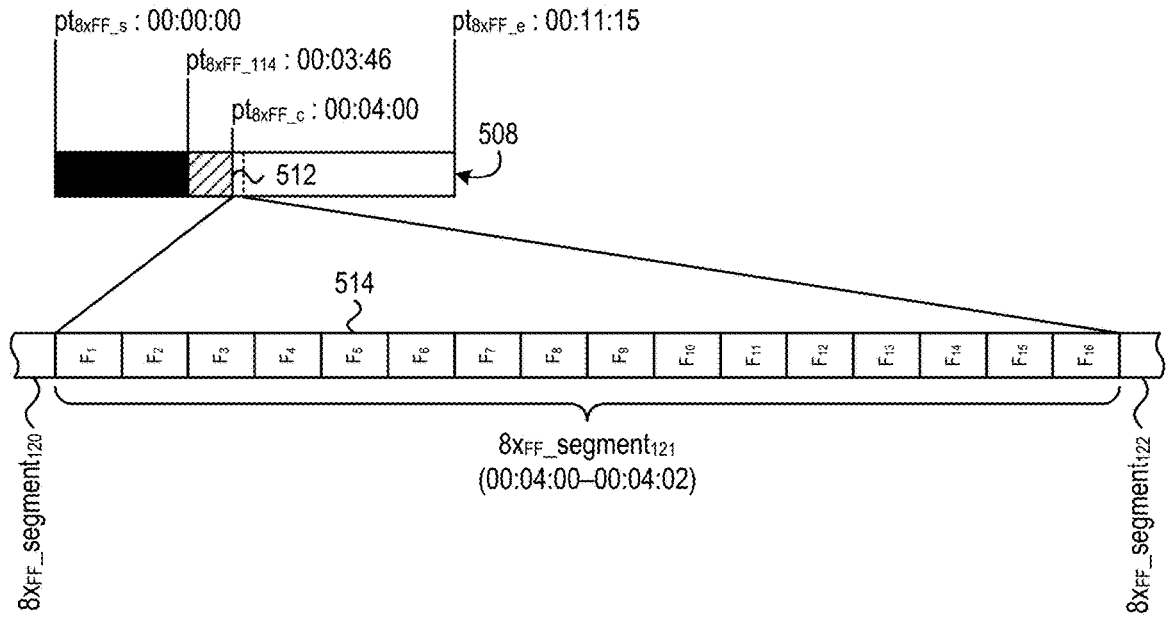
FIG. 5B shows the fast-forward trick play video content and the normal speed content of FIG. 5A subsequent to the fast-forward trick play.
Figure 5B:
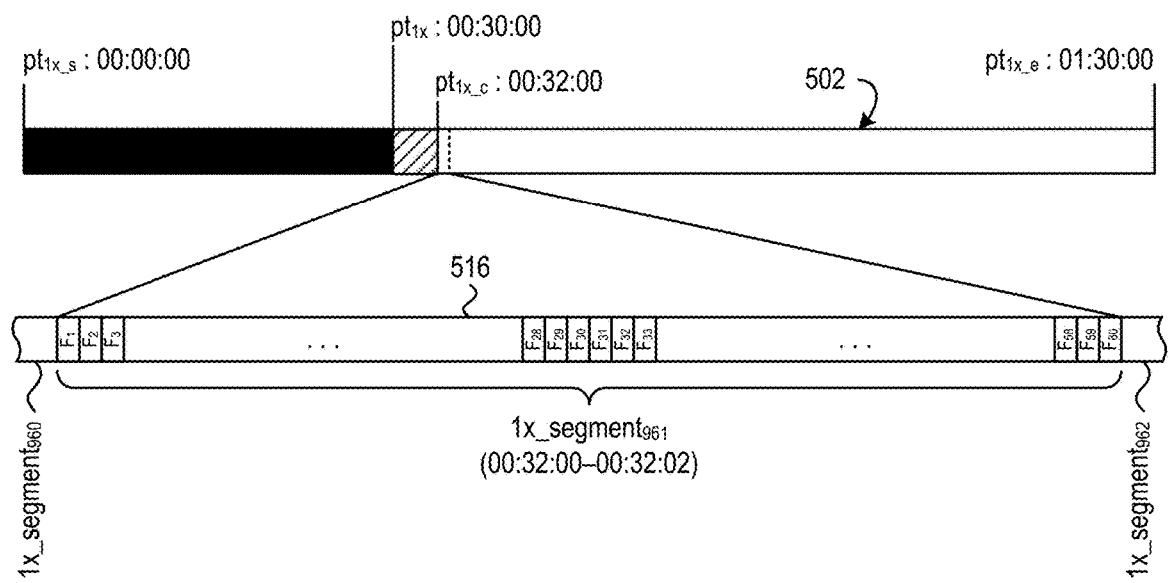

In FIG. 5B, the playback timelines and corresponding video segments when transitioning from the 8× FF trick play to normal rate playback are shown. The playback device may perform a similar process to determine where to resume normal rate playback of the normal rate video content. Here, the playback device may determine a trick play playback time, $pt_{f,seg}$, associated with a currently outputted video frame of the current trick play video segment. Based on this trick play playback time, the playback device may select a normal rate video segment at which to resume playback of the normal rate video content. The playback device may similarly map the determined trick play playback time on the FF trick play playback timeline to a corresponding normal rate playback time on the normal rate playback timeline. The playback device may request, from the content provider, the normal rate video segment associated with that corresponding normal rate playback time and may output the normal rate video segment received. The playback device may continue to request the subsequent normal rate video segments until the user initiates a new trick play or until the normal rate playback timeline expires.

As shown in FIG. 5B and indicated by the shaded portion 512 of the FF trick play playback timeline 508, the FF trick play begins at 00:03:46 and ends at 00:04:00 (i.e., $pt_{8\times\_FF\_114}$=00:03:46 and $pt_{8\times\_FF\_c}$=00:04:00). Playback of the 8× FF trick play in this example has occurred for fourteen seconds, and the current playback time, $pt_{8\times\_FF\_c}$, of the FF trick play playback timeline 508 is 00:04:00 when the user stops playback of the 8× FF trick play. Accordingly, trick play video segment 514 corresponds to a trick play playback time of $pt_{8\times\_FF\_c}$. The trick play video segment 514, in this example, includes sixteen total video frames, enumerated $F_1$-$F_{16}$, and corresponds to 00:04:00-00:04:02 on the FF trick play playback timeline 508 which, in turn, corresponds to the $121^{st}$ video segment of the 8× FF trick play video content.

The trick play playback time, $pt_{f,seg}$, associated with the video frames of a trick play video segment may likewise be determined in different ways. For example, operations such as those described above with reference to FIG. 5A for determining the normal rate playback time associated with the video frames of a normal rate video segment may be selectively employed. Again for the sake of convenience and by way of example only, the starting time of the video segment 514 (e.g., 00:04:00) is used as the playback time associated with the video frames of the trick play video segment in the present example.

The playback device may determine the trick play playback time associated with the currently outputted video frame of the current trick play video segment, $pt_{f,seg}$, and similarly map the determined trick play playback time to a corresponding normal rate playback time, $pt_{1\times\_c}$, in order to determine the normal rate video segment at which playback of the normal rate video content should resume. To determine the corresponding normal rate playback time, $pt_{1\times\_c}$, the trick play playback time associated with the currently outputted trick play video frame, $pt_{f,seg}$, may be multiplied by the trick play playback rate, R ($pt_{1\times\_c}=pt_{f,seg}\times R$). The playback device may determine at which normal rate video segment to resume playback of the normal rate video content based on the corresponding normal rate playback time, $pt_{1\times\_c}$. The playback device may resume playback of the normal rate video content at the first normal rate video segment with a starting playback time on the normal rate playback timeline that is greater than or equal to the determined corresponding normal rate playback time, $pt_{1\times\_c}$.

In FIG. 5B, normal rate playback resumes from an 8× FF trick play that stops at 00:04:00 on the FF trick play playback timeline 508. A trick play playback time, $pt_{f,seg}$, of 00:04:00 for an 8× FF trick play maps to a corresponding normal rate playback time, $pt_{1\times\_c}$, of 00:32:00 ($pt_{f,seg}$=00:04:00=240 s; 240 s×8=1,920 s; 1,920 s=00:32:00). Accordingly, 14 s of 8× FF trick play advances the normal rate playback timeline 502 by two minutes in this example. A 00:32:00 normal rate playback time, $pt_{1\times\_c}$, thus corresponds to the 961$^{st}$ normal rate video segment 516 of the normal rate video content which, in turn, corresponds to 00:32:00-00:32:02 on the normal rate playback timeline 502. Accordingly, the first normal rate video segment having a starting playback time greater than or equal to the corresponding normal rate playback time, $pt_{1\times\_c}$, of 00:32:00 is the 961$^{st}$ normal rate video segment 516 itself. The playback device may resume playback of the normal rate video content at its 961$^{st}$ normal rate video segment 516.

Figure 6A:
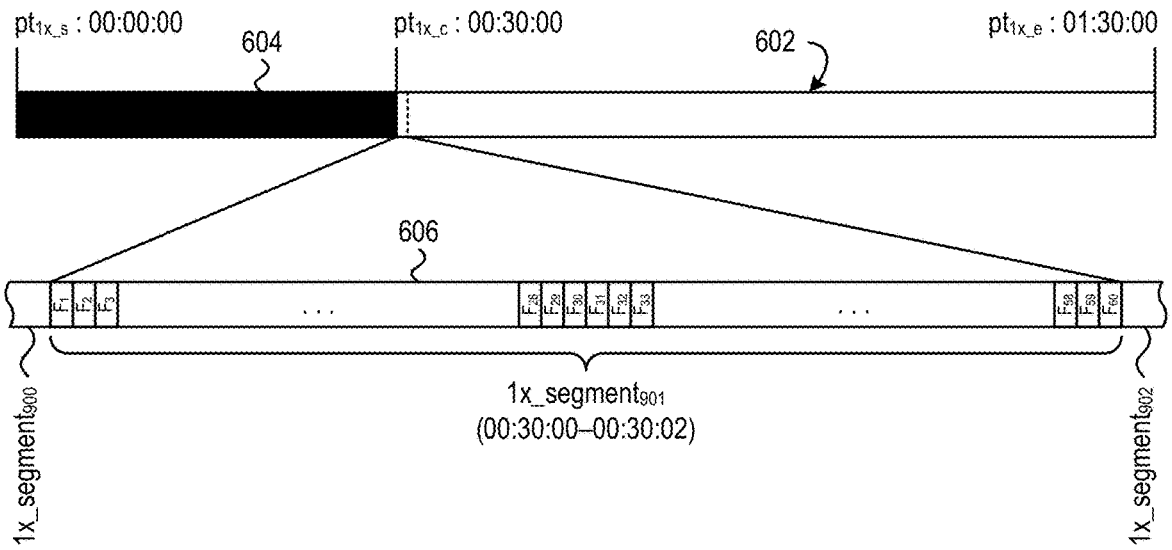
FIG. 6A shows example rewind trick play video content and normal speed content prior to a rewind trick play.
Figure 6A:
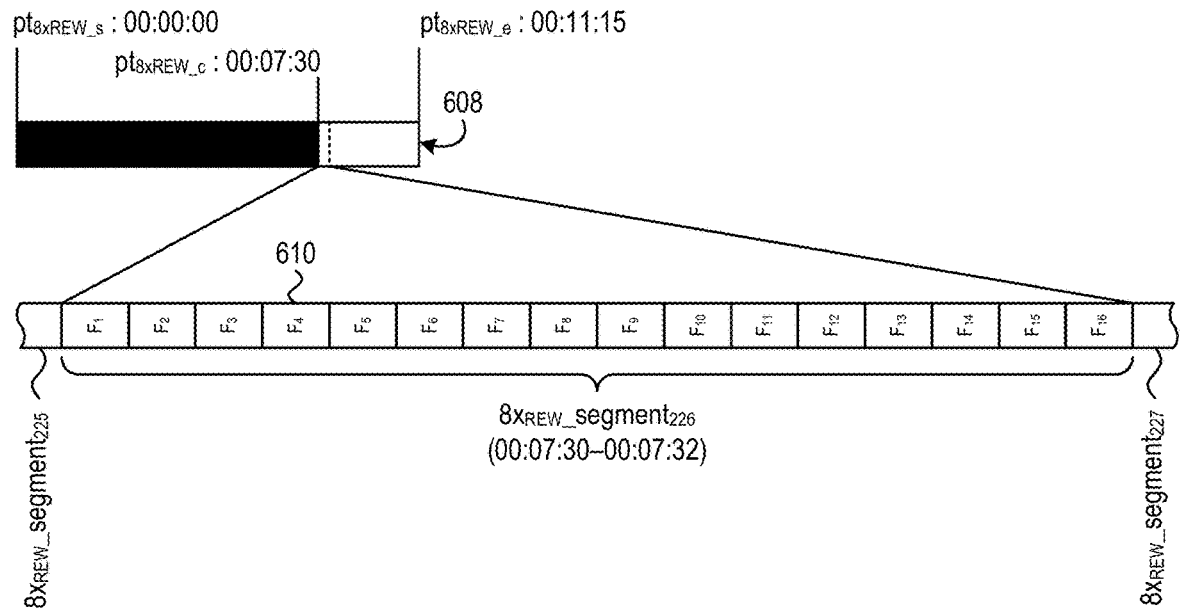

FIG. 6A shows the playback timelines and corresponding video segments when transitioning from normal rate playback to an 8×REW trick play. The REW trick play video file corresponding to a normal rate video file may reverse the sequence of its video frames relative to the normal rate video file. The final video frame of a normal rate video file may be the first video frame of the corresponding REW trick play video file. Likewise, the first video frame of the normal rate video file may be the final video frame of the corresponding REW trick play video file. Depending on which subset of video frames of the normal rate video file are selected for the corresponding REW trick play file, the first and final video frames of the REW trick play file may instead be video frames near the end and beginning of the normal rate video file, respectively. By reversing the sequence of the video frames in a REW trick play file, a playback device may output the REW trick play file using the same functionality used to output the normal rate video file. Reversing the sequence of video frames in an REW trick play file results in alternative calculations used to map a current normal rate playback time on the normal rate playback timeline to a corresponding trick play playback time on the REW trick play timeline.

The playback device may determine where to begin playback of the REW trick play by determining a normal rate playback time, $pt_{f,seg}$, associated with the currently outputted video frame of the current normal rate video segment. Based on this normal rate playback time, the playback device may select a trick play video segment at which to begin playback of the 8×REW trick play. Here again, the playback device may map the determined normal rate playback time, $pt_{f,seg}$, on the normal rate playback timeline to a corresponding trick play playback time on the REW trick play playback timeline. The playback device may request, from the content provider, the trick play video segment associated with that corresponding trick play playback time and output the trick play video segment received. The playback device may continue to request the subsequent trick play video segments of the 8×REW trick play until the user stops the trick play (or until the trick play timeline expires) at which point the playback device may transition back to normal rate playback to output the normal rate video content.

As shown in FIG. 6A, the normal rate playback timeline 602 is again one hour and thirty minutes in duration, i.e., $pt_{1\times\_s}$=00:00:00 and $pt_{1\times\_e}$=01:30:00. As also shown in FIG. 6A, thirty minutes have again elapsed on the normal rate playback timeline 602, i.e., $pt_{1\times\_c}$=00:30:00, as indicated by the shaded portion 604 of the timeline. Accordingly, the normal rate video segment 606 corresponds to a normal rate playback time of $pt_{1\times\_c}$. The normal rate video segment 606, in this example, likewise includes sixty total video frames, enumerated $F_1$-$F_{60}$, and likewise corresponds to 00:30:00-00:30:02 on the normal rate playback timeline 602 which, in turn, again corresponds to the 901$^{st}$ video segment of the normal rate video content. The normal rate playback time, $pt_{f,seg}$, associated with the video frames of the normal rate video file may be determined using one of the various operations discussed above with reference to FIG. 5A. Again for the sake of convenience and by way of example only, the starting time of a video segment (e.g., 00:30:00 for video segment 606) is used as the playback time associated with the video frames of the normal rate segment in the present example.

The playback device may determine the normal rate playback time, $pt_{f,seg}$, associated with the currently outputted video frame of the current normal rate video segment and map the determined playback time to a corresponding trick play playback time, $pt_{R\_REW\_c}$, in order to determine at which trick play video segment it should begin playback of the REW trick play. If the sequence of video frames in the REW trick play video file is reversed relative to the normal rate video file as described above, the mapping may be relative to the ending playback time on the trick play playback timeline. The corresponding trick play playback time, $pt_{R\_REW\_c}$, may be determined by dividing the normal rate playback time, $pt_{f,seg}$, associated with the currently outputted normal rate video frame by the trick play playback rate, R, and the result may be subtracted from the ending playback time, $pt_{R\_REW\_e}$, on the trick play playback timeline ($pt_{R\_REW\_c}=pt_{R\_REW\_e}-(pt_{f,seg}\div R)$). The playback device may determine at which trick play video segment to begin playback of the REW trick play based on the corresponding trick play playback time, $pt_{R\_REW\_c}$. The playback device may begin playback of the REW trick play at the first trick play video segment with a starting playback time on the REW trick play playback timeline that is greater than or equal to the determined corresponding trick play playback time, $pt_{R\_REW\_c}$.

In FIG. 6A, the REW trick play is an 8×REW trick play. Accordingly, the REW trick play timeline 608 for the 8×REW trick play is again one eighth the duration of the normal rate playback timeline 602, i.e., $pt_{8\times\_REW\_s}$=00:00:00 and $pt_{8\times\_REW\_e}$=00:11:15. The video segment 610 for the 8×REW trick play is also two seconds in duration but includes fewer video frames, $F_1$-$F_{16}$. In this example, $pt_{1-60,901}$=00:30:00—the normal rate playback time associated with the video frames, $F_1$-$F_{60}$, of the $901^{st}$ normal rate video segment 506. This normal rate playback time, $pt_{1\text{-}60,901}$, maps to a corresponding trick play playback time, $pt_{8\times\_REW\_c}$, of 00:07:30 ($pt_{1\text{-}60,901}$=00:30:00=1,800 s; $pt_{8\times\_REW\_e}$=00:11:15=675 s; 675 s−(1,800 s÷8)=675 s−225 s=450 s; 450 s=00:07:30). A 00:07:30 playback time, $pt_{8\times\_REW\_c}$, corresponds to the $226^{th}$ video segment of the 8×REW trick play video content which, in turn, corresponds to 00:07:30-00:07:32 on the REW trick play playback timeline 608. Accordingly, the first trick play video segment having a starting playback time greater than or equal to the corresponding trick play time, $pt_{8\times\_REW\_c}$, of 00:07:30 is the $226^{th}$ trick play video segment itself. The playback device may begin playback of the 8×REW trick play at its $226^{th}$ trick play video segment.

Figure 6B:
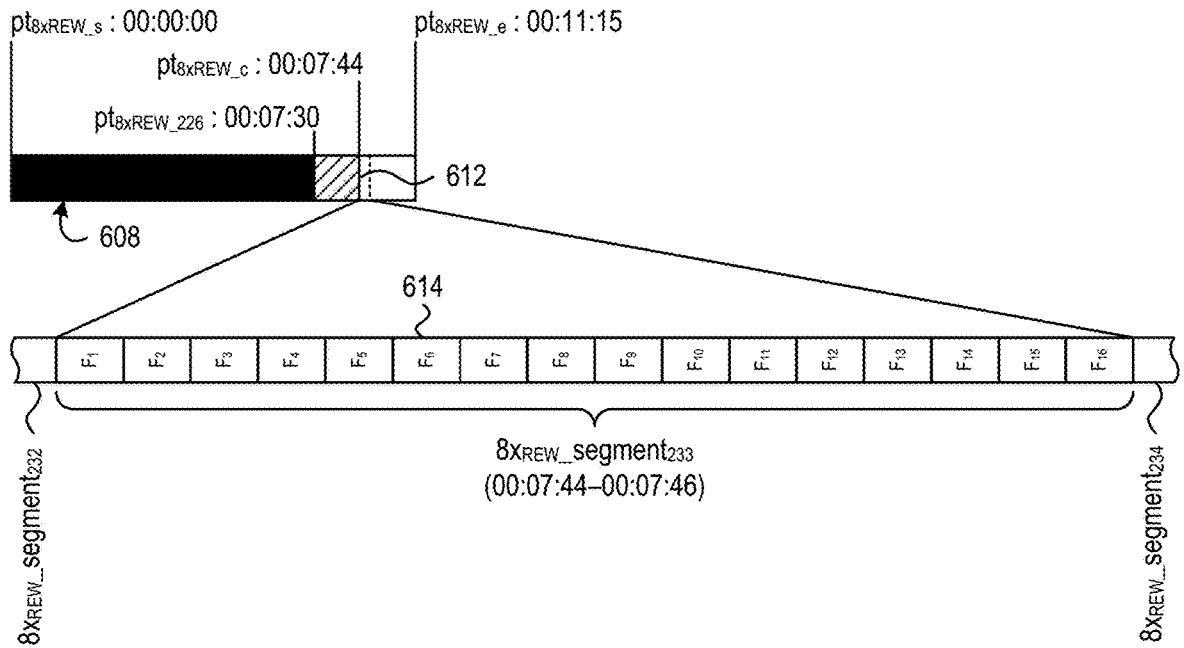
FIG. 6B shows the rewind trick play video content and the normal speed content of FIG. 6A subsequent to the rewind trick play.
Figure 6B:
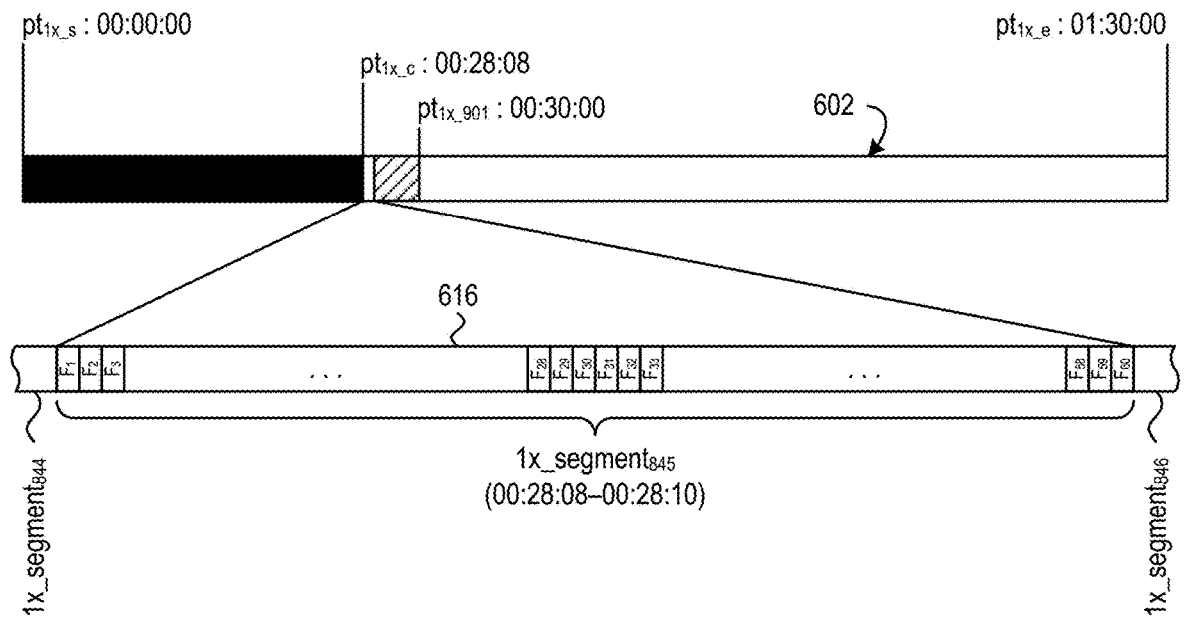

FIG. 6B shows the playback timelines and corresponding video segments when transitioning from the 8×REW trick play to normal rate playback. The playback device may perform a similar process to determine where to resume normal rate playback of the normal rate video content. Here, the playback device may again determine a trick play playback time, $pt_{f,seg}$, associated with a currently outputted video frame of the current trick play video segment. Based on this trick play playback time, the playback device may likewise select a normal rate video segment at which to resume playback of the normal rate video content. The playback device may similarly map the determined trick play playback time on the REW trick play playback timeline to a corresponding normal rate playback time on the normal rate playback timeline. The playback device may request, from the content provider, the normal rate video segment associated with that corresponding normal rate playback time and output the normal rate video segment received. The playback device may continue to request the subsequent normal rate video segments until the user initiates a new trick play or until the normal rate playback timeline expires.

As indicated by the partially-shaded portion 612 of the REW trick play playback timeline 608, the REW trick play begins at 00:07:30 and ends at 00:07:44 (i.e., $pt_{8\times\_REW\_226}$=00:07:30 and $pt_{8\times\_REW\_c}$=00:07:44). Playback of the 8×REW trick play in this example has thus occurred for fourteen seconds, and the current playback time, $pt_{8\times\_REW\_c}$, of the REW trick play playback timeline 608 is 00:07:44 when the user stops playback of the 8×REW trick play. Accordingly, trick play video segment 614 corresponds to a trick play playback time of $pt_{8\times\_REW\_c}$=00:07:44. The trick play video segment 614, in this example, includes sixteen total video frames, enumerated $F_1$-$F_{16}$, and corresponds to 00:07:44-00:07:46 on the REW trick play playback timeline 608 which, in turn, corresponds to the $233^{rd}$ video segment of the 8×REW trick play video content. The trick play playback time, $pt_{f,seg}$, associated with the video frames of a trick play video segment may again be determined in different ways. Operations such as those described above with reference to FIG. 5A for determining the playback time associated with the video frames of a normal rate video segment may be selectively employed. For the sake of convenience and by way of example only, the starting time of the video segment 614 (e.g., 00:07:44) is used as the playback time associated with the video frames of the trick play video segment in the present example.

The playback device may determine the trick play playback time associated with the currently outputted video frame of the current trick play video segment, $pt_{f,seg}$, and similarly map the determined trick play playback time to a corresponding normal rate playback time, $pt_{1\times\_c}$, in order to determine the normal rate video segment at which playback of the normal rate video content should resume. If the sequence of video frames in the REW trick play video file is reversed relative to the normal rate video file, the mapping may be relative to the ending playback time on the trick play playback timeline. The corresponding normal rate playback time, $pt_{1\times\_c}$, the trick play playback time, $pt_{f,seg}$, associated with the currently outputted trick play video frame may be subtracted from the ending playback time, $pt_{R\_REW\_e}$, on the trick play playback timeline, and the result may be multiplied by the trick play playback rate, R ($pt_{1\times\_c}$=($pt_{R\_REW\_e}$−$Pt_{f,seg}$)×R)). The playback device may determine the normal rate video segment at which to resume playback of the normal rate video content based on the corresponding normal rate playback time, $pt_{1\times\_c}$. The playback device may resume playback of the normal rate video content at the first normal rate video segment with a starting playback time on the normal rate playback timeline that is greater than or equal to the determined corresponding normal rate playback time, $pt_{1\times\_c}$.

In FIG. 6B, normal rate playback resumes from an 8×REW trick play that stops at 00:07:44 on the REW trick play playback timeline 608. A trick play playback time, $pt_{f,seg}$, of 00:07:44 for an 8×REW trick play maps to a corresponding normal rate playback time, $pt_{1\times\_c}$, of 00:28:08 ($pt_{f,seg}$=00:07:44=464 s; $pt_{8\times\_e}$=00:11:15=675 s; (675 s−464 s)×8=211 s×8=1,688 s; 1,688 s=00:28:08). Accordingly, 14 s of 8×REW trick play rewinds the normal rate playback timeline by one minute and fifty-two seconds in this example. A 00:28:08 normal rate playback time, $pt_{1\times\_c}$, corresponds to the $845^{th}$ normal rate video segment 616 of the normal rate video content which, in turn, corresponds to 00:28:08-00:28:10 on the normal rate playback timeline 602. Accordingly, the first normal rate video segment having a starting playback time greater than or equal to the corresponding normal rate playback time, $pt_{1\times\_c}$, of 00:28:08 is the $845^{th}$ normal rate video segment 616 itself. The playback device may resume playback of the normal rate video content at its $845^{th}$ normal rate video segment 616.

The operations described above for transitioning between playback of normal rate video content and a trick play may also be used to transition between different trick plays. For example, the operations described may be used to transition between a 2× FF trick play and a 4× FF trick play, a 4× FF trick play and an 8× FF trick play, and so forth, when a user speeds up or slows down a trick play. These operations may be used to map a 2× FF playback time associated with the current video frame outputted during a 2× FF trick play to a corresponding 4× FF playback time in order to determine where to begin playback of the 4× FF trick play when a user speeds up the trick play. Similarly, these operations may be used to map a 4× FF playback time associated with the current video frame outputted during a 4× FF trick play to a corresponding 2× FF playback time in order to determine where to begin playback of the 2× FF trick play when the user slows down the trick play. Additional and alternative examples will be appreciated with the benefit of this disclosure.

Figure 7:
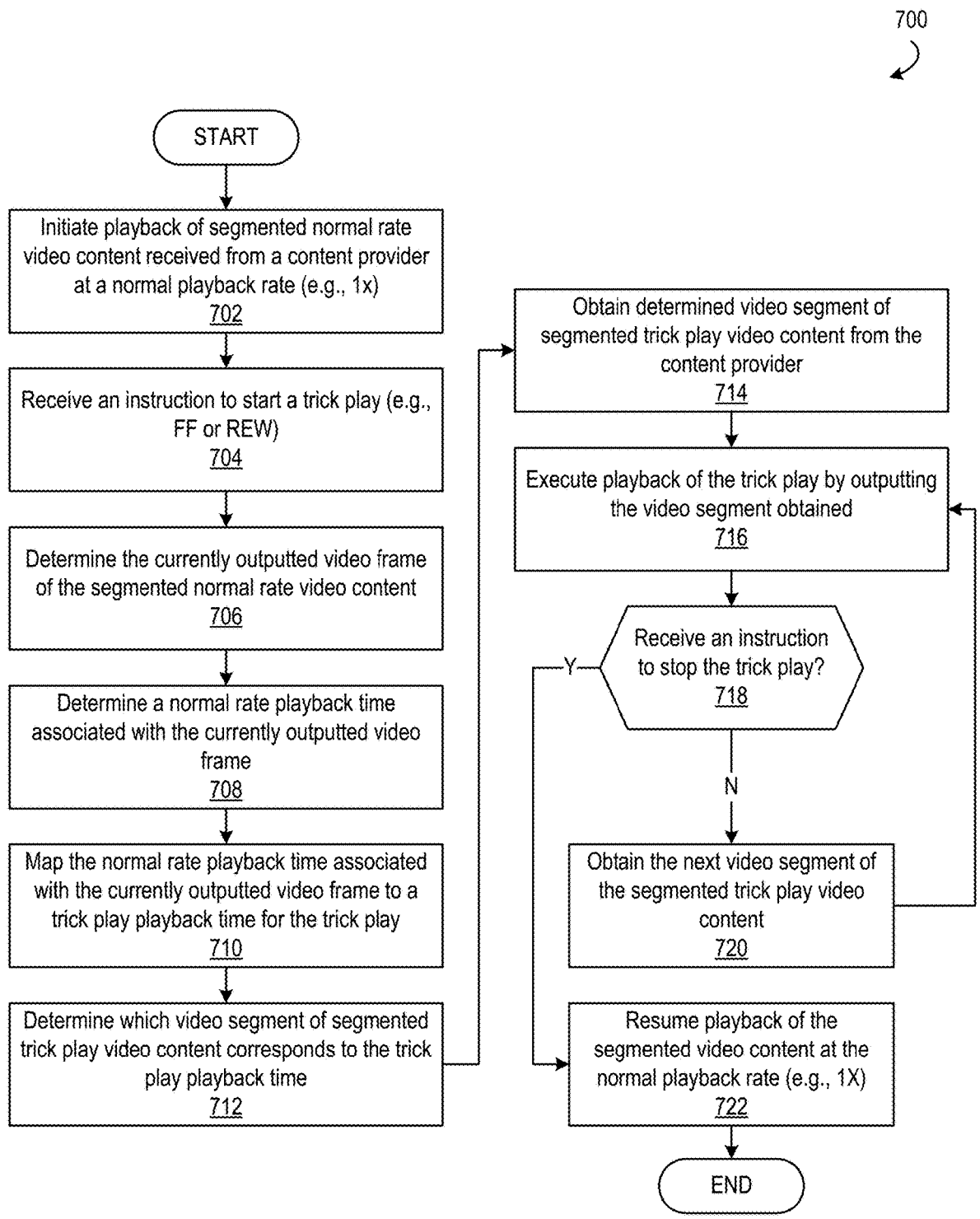
FIG. 7 shows a flowchart of example method steps for starting a trick play.

FIG. 7 is a flowchart 700 of example method steps for starting a trick play of segmented video content. To begin, a playback device may initiate playback of segmented normal rate video content received from a content provider at a normal playback rate, e.g., 1× (702). During output of the normal rate video content, the playback device may receive an instruction to start a trick play (704). The playback device may receive the instruction to start the trick play from a user who provides user input requesting a FF trick play or a REW trick play of the normal rate video content being output by the playback device. The user may provide the user input at a remote control device (e.g., a physical FF button or a physical REW button) or at a user interface element of a graphical user interface (e.g., a virtual FF button or a virtual REW button). After receiving the instruction to start the trick play, the playback device may determine which video frame of the normal rate video content is currently outputted (706) and may determine a normal rate playback time associated with the currently outputted video frame (708). The playback device may map the normal rate playback time associated with the currently outputted video frame to a trick play playback time for the trick play requested (710). The playback device may determine which video segment of the corresponding segmented trick play video content corresponds to the trick play playback time determined (712). The determined video segment may thus be the point at which the playback device will begin playback of the trick play. The playback device may use any of the operations described above with reference to FIGS. 5A and 6A to, e.g., determine the normal rate playback time associated with the currently outputted normal rate video frame, map that normal rate playback time to a corresponding trick play playback time, and determine which trick play video segment corresponds to that trick play playback time.

After determining where to begin playback of the trick play, the playback device may obtain the determined video segment of the trick play video content from the content provider (714) and may execute playback of the trick play by outputting the video segment obtained (716). While the playback device does not receive an instruction to stop the trick play (718:N), the playback device may obtain the next video segment of the segmented trick play video content (720) and continue playback of the trick play by outputting the newly obtained video segment (716). After receiving an instruction to stop the trick play (718:Y), the playback device may resume playback of the normal rate video content at the normal playback rate, e.g., 1× (722). Resuming playback of the normal rate video content is discussed in further detail below with reference to FIG. 8. The playback device may, for example, resume playback of the normal rate video content (722) by performing steps 806-822 of FIG. 8. The playback device may receive the instruction to stop the trick play from the user who provides user input at a physical or virtual button (e.g., a STOP button, a PLAY button, the FF button, or the REW button) of a remote control device or a graphical user interface, respectively. The playback device may also receive the instruction to stop the trick play in response to a determination that the trick play playback timeline has expired.

Figure 8:
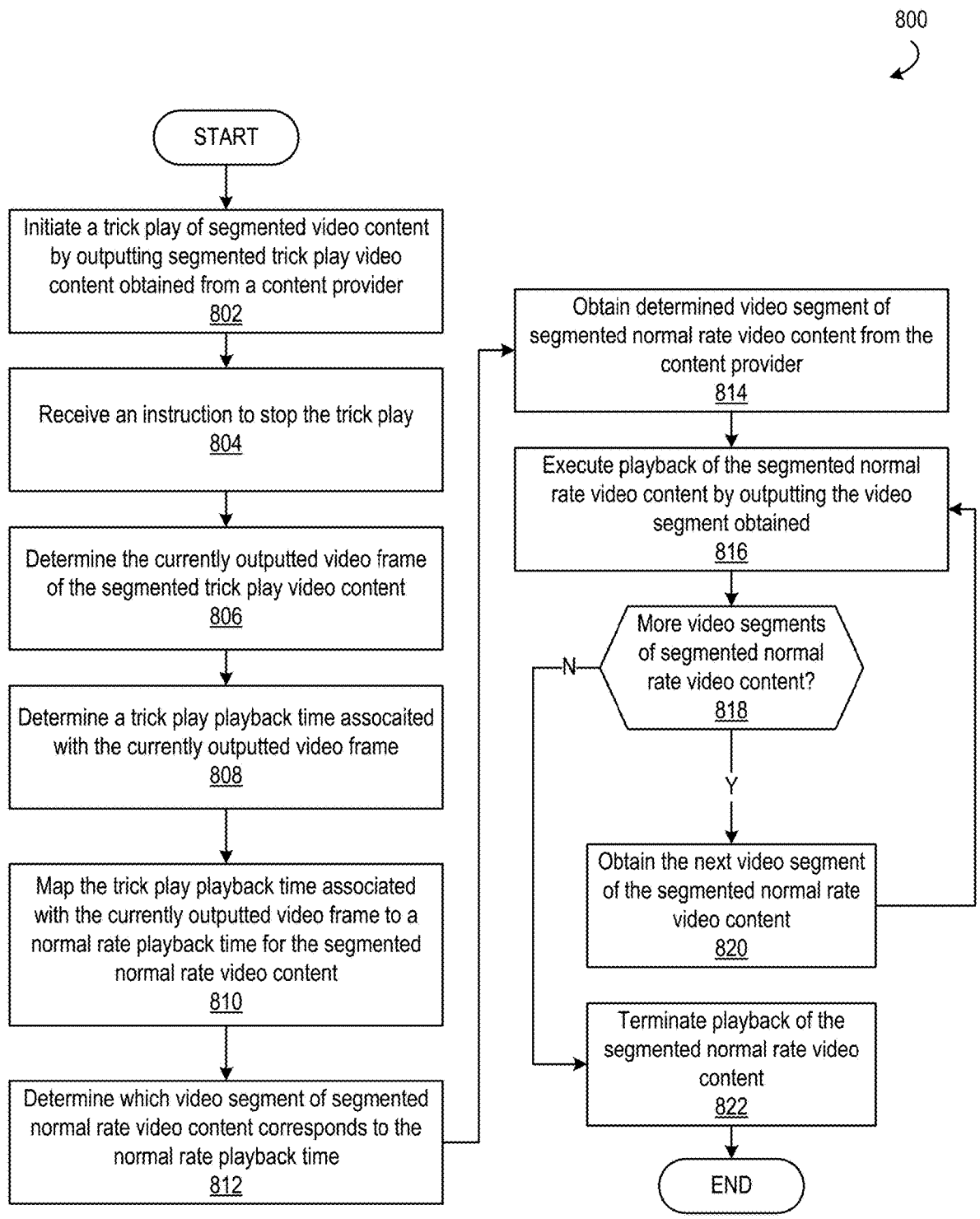
FIG. 8 shows a flowchart of example method steps for stopping a trick play.

FIG. 8 is a flowchart 800 of example method steps for stopping a trick play. To begin, a playback device may initiate playback of a trick play for segmented normal rate video content by outputting segmented trick play video content obtained from a content provider (802). The playback device may, for example, initiate playback of a trick play (822) by performing steps 702-716 of FIG. 7. During output of the trick play video content, the playback device may receive an instruction to stop the trick play (804). The playback device may receive the instruction to stop the trick play from a user that provides user input requesting stoppage of the trick play. As noted, the user may provide the user input via a remote control or a graphical user interface. After receiving the instruction to stop the trick play, the playback device may determine which video frame of the trick play video content is currently outputted (806) and may determine a trick play playback time associated with the currently outputted video frame (808). The playback device may map the trick play playback time associated with the currently outputted video frame for the trick play to a normal rate playback time for the normal rate video content (810). The playback device may determine which video segment of the corresponding segmented normal rate video content corresponds to the normal rate playback time determined (812). The determined video segment may the point at which the playback device will resume playback of the normal rate video content. The playback device may use any of the operations described above with reference to FIGS. 5B and 6B to, e.g., determine the trick play playback time associated with the currently outputted video frame, map that trick play playback time to a corresponding normal rate playback time, and determine which normal rate video segment corresponds to that normal rate playback time.

After determining where to resume playback of the normal rate video content, the playback device may obtain the determined video segment of the normal rate video content from the content provider (814), and may execute playback of the normal rate video content by outputting the video segment obtained (816). While there remain more video segments of the normal rate video content (818:Y), the playback device may obtain the next video segment of the normal rate video content (820) and continue playback of the normal rate video content by outputting the newly obtained video segment (816). When no more video segments remain (818:N), the playback device may terminate playback of the normal rate video content (822). The user may initiate another trick play during playback of the normal rate video content for which the playback device may repeat the steps shown by way of example in FIGS. 7-8 to transition between playback of the normal rate video content and the trick play.

Figure 9:
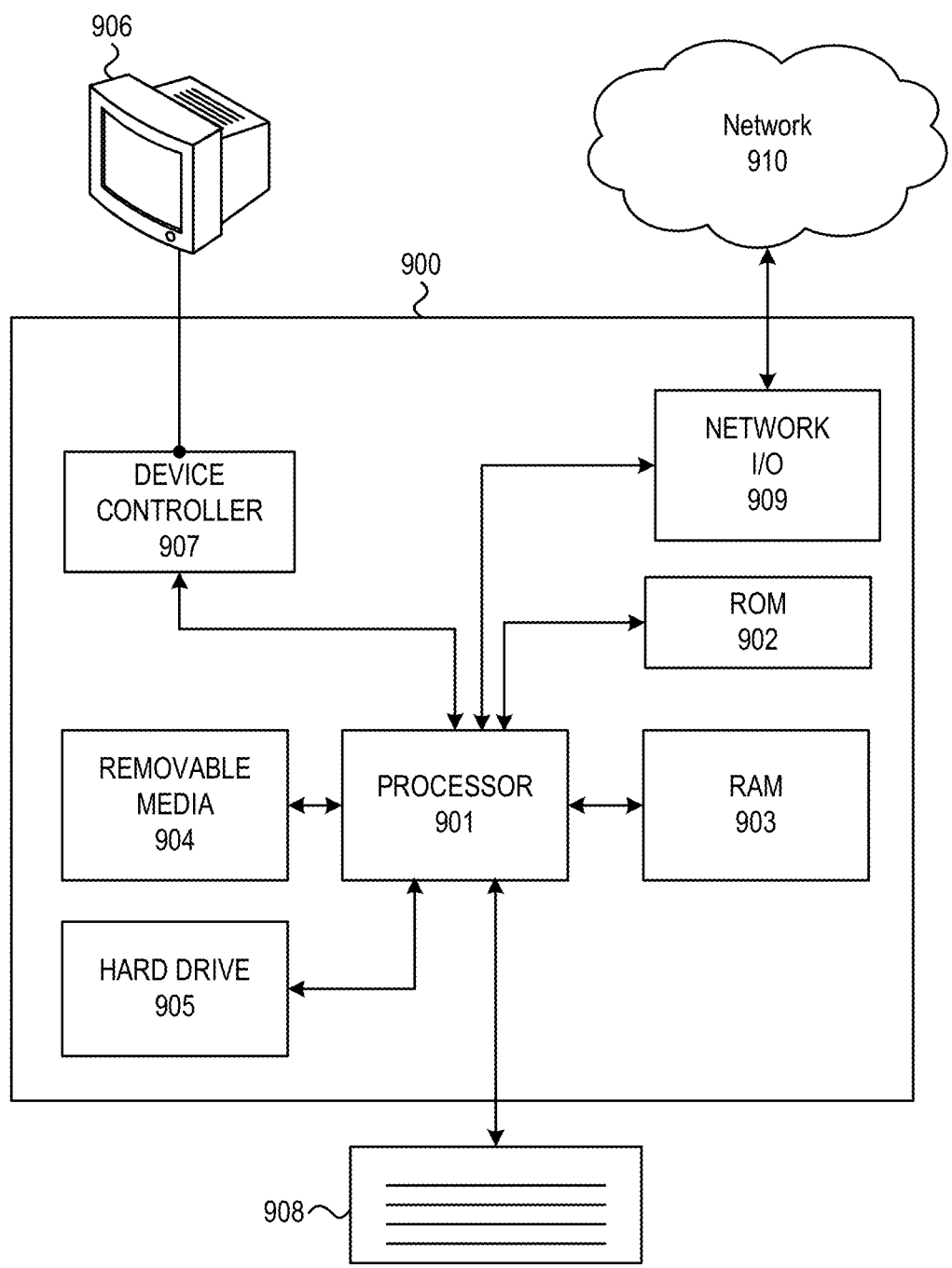
FIG. 9 shows an example of a computing platform.

The various devices described herein may be computing devices, and FIG. 9 shows an example of general hardware elements that may be used to implement any of the various computing devices discussed herein. The computing device 900 may include one or more processors 901, which may execute instructions of a computer program to perform any of the features described herein. The instructions may be stored in any type of computer-readable medium or memory, to configure the operation of the processor 901. For example, instructions may be stored in a read-only memory (ROM) 902, a random access memory (RAM) 903, a hard drive, removable media 904, such as a Universal Serial Bus (USB) drive, compact disk (CD) or digital versatile disk (DVD), floppy disk drive, or any other desired electronic storage medium. Instructions may also be stored in an attached (or internal) hard drive 905. The computing device 900 may include one or more output devices, such as a display 906 (or an external television), and may include one or more output device controllers 907, such as a video processor. There may also be one or more user input devices 908, such as a remote control, keyboard, mouse, touch screen, microphone, etc. The computing device 900 may also include one or more network interfaces, such as input/output circuits 909 (such as a network card) to communicate with an external network 910. The network interface may be a wired interface, wireless interface, or a combination of the two. The interface 909 may include a modem (e.g., a cable modem), and network 910 may include the communication links 101 discussed above with reference to FIG. 1, the external network 109 (FIG. 1), an in-home network, a provider's wireless, coaxial, fiber, or hybrid fiber/coaxial distribution system (e.g., a DOCSIS network), or any other desired network.

While REW trick plays were described by way of example above using REW trick play video files in which the sequence of video frames is reversed relative to the corresponding normal rate video file, this need not be the case. REW trick play video files may, for example, include a subset of video frames from the normal rate video file in the same sequence as the normal rate video file. The REW trick play may begin with the first trick play video segment having a smaller ending playback time, $pt_{R\_e}$, than the corresponding trick play playback time mapped from the normal rate playback time determined. Here, the REW trick play may output the video frames of that trick play video segment in reverse order starting with the last video frame of the trick play video segment. The playback device may subsequently request the previous trick play video segment to continue playback of the REW trick play.

Alternative trick play playback speeds may be selectively employed. For instance, rather than 2×, 4×, 8×, and 16× trick play playback speeds, trick play speeds of 1.5×, 3×, 6×, and 12× trick play may be available. More generally, different levels of trick play speeds may be available in which each level is relatively faster than the level that precedes it. For instance, four levels of trick play playback speeds may be available, which may be denoted "Level 1," "Level 2," "Level 3," and "Level 4," respectively. The Level 1 trick play playback speed may be relatively faster than the normal rate playback speed, the Level 2 trick play playback speed may be relatively faster than that of Level 1, the Level 3 trick play playback speed may be relatively faster than that of Level 2, and the Level 4 trick play playback speed may be relatively faster than that of Level 3.

The segmented video content may be encoded and delivered to a playback device in different ways. For example, different communication protocols, video formats (e.g., resolution and aspect ratio), framerates, video segment durations, and video codecs may be selectively employed. Some examples of adaptive media streaming communications protocols that may be employed to stream segmented video content from a video server to a playback device include, e.g., Dynamic Adaptive Streaming over HTTP (MPEG-DASH), HTTP Live Streaming (HLS). Some examples of network communication protocols that may be employed to deliver video fragments from a video server to a playback device include TCP/IP, HTTP/1.1, HTTP/2.0, and QUIC (Quick UDP Internet Connections). Example aspect ratios for the segmented video content include 16:9 and 4:3. Example resolutions at a 16:9 aspect ratio include, e.g., 416×234, 480×270, 640×360, 960×540, 1280×720, and 1920×1080. Example resolutions at a 4:3 aspect ratio include, e.g., 400×300, 480×360, 640×480, 960×720, 1280×960, and 1920×1440. Example framerates include, e.g., 12 fps, 15 fps, 24 fps (23.98 fps), 25 fps, 30 fps (29.97 fps), 50 fps, and 60 fps (59.94 fps). The segmented video content may be formatted according to other example video formats including: low-definition television (LDTV) video formats, e.g., 96p, 120p, 144p, 240p, 288p, and 360p; standard-definition television (SDTV) video formats, e.g., 576i 4:3, 576i 16:9, 480i 4:3, and 480i 16:9; enhanced-definition television (EDTV) video formats, e.g., 480p, 576p, 480i, and 576i; high-definition television (HDTV) video formats, e.g., 720p, 1080p, and 1080i; and ultra-high definition television (UHDTV) video formats, e.g., 2160p and 4320p. Some examples of video codecs that may be employed for the segmented video content include H.264/MPEG-4 AVC (Moving Picture Experts Group, Advanced Video Coding) and H.265/MPEG-H Part 2/HEVC (High Efficiency Video Coding). The video content may be compressed using vector-based compression techniques in which a video frame is presented using contoured colors rather than an arrangement of pixels.

Figure 10:
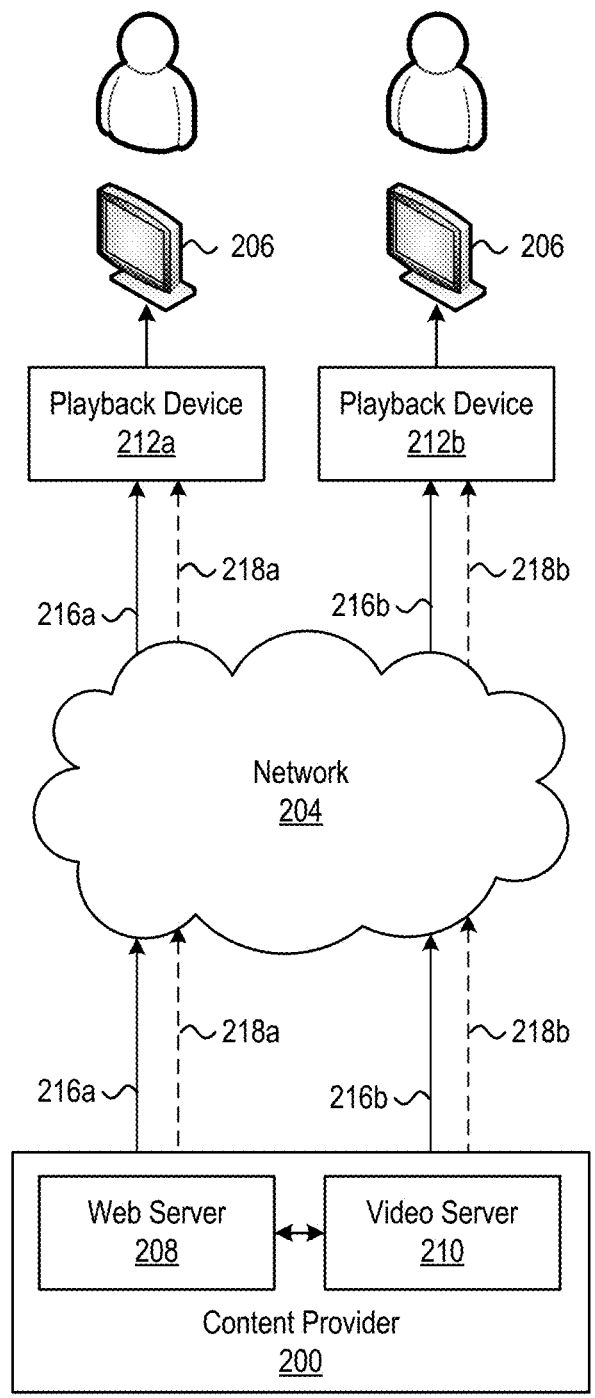
FIG. 10 shows an example configuration of a system for simultaneously providing trick play video content and non-trick play video content.

A video server may simultaneously provide (e.g., stream) both trick play video content and non-trick play video content. FIG. 10 shows an example. The system of FIG. 10 may include a content provider system 200 having a web server 208 and a video server 210 as described above. The content provider system may be in signal communication, via a network 204, with multiple playback devices 212a and 212b which may be the same as or similar to playback devices 202 discussed above with reference to FIG. 2. The playback devices 212a and 212b similarly may be connected to a respective display device 206. The playback devices 212a and 212b may be located at the same premises (e.g., different rooms of a residence or the same room of a bar/restaurant) or at different premises (e.g., different residences).

The content provider system 200 may provide both non-trick play video content and trick play video content to one or more of the playback devices 212a and 212b. In FIG. 10, non-trick play video content is denoted using a solid line and trick play video content is denoted using a dashed (broken) line. For example, the content provider system 200 may provide non-trick play video content 216a to playback device 212a and may provide non-trick play video content 216b to playback device 212b. Similarly, the content provider system may provide trick play video content 218a to playback device 218a and may provide trick play video content 218b to playback device 218b. The non-trick play video content may include, for example, movies, television shows, sporting events, and the like. The trick play video content may include, for example, fast-forward trick plays and rewind trick plays of the movies and the television shows as well as replays of the sporting events. Additional and alternative examples will be appreciated with the benefit of this disclosure.

As noted, the content provider system 200, in this example, may provide the non-trick play video content and/or the trick play video content simultaneously. For example, the content provider system 200 may provide (i) the non-trick play video content 216a simultaneously with the trick play video content 218a to the playback device 212a, (ii) the non-trick play video content 216a to the video playback device 212a simultaneously with the non-trick play video content 216b to the video playback device 212b, (iii) the trick play video content 218a to the video playback device 212a simultaneously with the non-trick play video content 216b to the video playback device 212b, (iv) the non-trick play video content 216a to the video playback device 212a simultaneously with the trick play video content 218b to the video playback device 212b, and (v) the non-trick play video content 216b simultaneously with the trick play video content 218b to the playback device 212b. Non-trick play video content 216a and non-trick play video content 216b may (but need not) be the same video content (e.g., the same movie, the same presentation of a sporting event, etc.), and trick play video content 218a and trick play video content 218b may (but need not) be trick play versions of that same video content. Additional and alternative examples will be appreciated with the benefit of this disclosure.

Although examples are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as will be appreciated upon review of this disclosure are intended to be part of this disclosure though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method comprising:
   receiving, by a video playback device and during output of segmented video content, a request to start a trick play;
   determining a trick play playback time that corresponds to a playback time associated with a video frame of the segmented video content that is outputted during receipt of the request to start the trick play;
   determining, based on a file indicating a mapping between the determined trick play playback time and the playback time associated with the video frame of the segmented video content that is outputted during receipt of the request to start the trick play, a video segment of segmented trick play video content at which to begin the trick play, wherein each segment of the segmented trick play video content has a playback duration equal to a segment of the segmented video content and corresponds to a portion of video content that is longer in duration than the video content contained in each segment of the segmented video content;
   buffering, by the video playback device, one or more segments of the segmented trick play video content to transition from the segmented video content to the segmented trick play video content, wherein at least one segment, of the one or more segments of the segmented trick play video content, comprises a sequence of consecutive video frames of the video content; and
   causing playback of the segmented trick play video content beginning with the determined video segment.

2. The method of claim 1, wherein the playback time is a starting playback time of a corresponding video segment, of the segmented video content, comprising the video frame.

3. The method of claim 1, further comprising:
   selecting, based on the trick play playback time, the determined video segment from among a plurality of video segments of the segmented trick play video content.

4. The method of claim 1, wherein the trick play playback time is determined at least by dividing the playback time by a playback rate of the trick play.

5. The method of claim 4, wherein:
   the trick play is a rewind trick play;
   video frames of the segmented trick play video content are arranged in reverse order relative to the segmented video content; and
   the trick play playback time is further determined by subtracting, from an ending playback time of the segmented trick play video content, a result obtained by the dividing.

6. The method of claim 1, wherein:
   the segmented video content comprises a set of video frames; and
   the segmented trick play video content comprises a subset of the set of video frames of the segmented video content.

7. The method of claim 1, wherein:
   the segmented video content comprises first segmented trick play video content associated with a first playback rate; and
   the segmented trick play video content comprises second segmented trick play video content associated with a second playback rate that is different than the first playback rate.

8. The method of claim 1, further comprising:
   receiving, by the video playback device and from a content provider, the file indicating the mapping between the determined trick play playback time and the playback time associated with the video frame of the segmented video content that is outputted during receipt of the request to start the trick play.

9. A method comprising:
   receiving, by a video playback device and during output of segmented trick play video content, a request to stop a trick play, wherein at least one segment of the segmented trick play video content comprises a sequence of consecutive video frames of the video content;
   determining a playback time that corresponds to a trick play playback time associated with a video frame of the segmented trick play video content that is outputted during receipt of the request to stop the trick play;
   determining, based on a file indicating a mapping between the determined playback time and the trick play playback time associated with the video frame of the segmented trick play video content that is outputted during receipt of the request to stop the trick play, a video segment of segmented video content at which to resume playback of the segmented video content, wherein each segment of the segmented video content has a playback duration equal to a segment of the segmented video content and corresponds to a portion of video content that is shorter in duration than the video content contained in each segment of the segmented trick play video content;
   buffering, by the video playback device, one or more segments of the segmented trick play video content to transition from the segmented trick play video content to the segmented video content; and
   causing playback of the segmented video content beginning with the determined video segment.

10. The method of claim 9, wherein the trick play playback time is a starting playback time of a corresponding video segment, of the segmented trick play video content, comprising the video frame.

11. The method of claim 9, further comprising:
    selecting, based on the playback time, the determined video segment from among a plurality of video segments of the segmented video content.

12. The method of claim 9, wherein a starting playback time of the determined video segment is greater than or equal to the playback time.

13. The method of claim 11, wherein:
    the trick play is a fast-forward trick play; and
    the playback time is further determined by multiplying the trick play playback time by a playback rate of the fast-forward trick play.

14. The method of claim 11, wherein:
    the trick play is a rewind trick play;
    video frames of the segmented trick play video content are arranged in reverse order relative to the segmented video content; and
    the playback time is further determined by multiplying a playback rate of the rewind trick play with a result obtained by subtracting the trick play playback time from an ending playback time of the segmented trick play video content.

15. The method of claim 9, wherein:
the segmented video content comprises first segmented trick play video content associated with a first playback rate; and
the segmented trick play video content comprises second segmented trick play video content associated with a second playback rate that is different than the first playback rate.

16. A method comprising:
outputting, by a video playback device, first segmented video content;
after receiving a request to start a trick play and based on a file indicating a mapping between a first playback time of the first segmented video content and a second playback time of a second segmented video content, receiving a plurality of segments of the second segmented video content, wherein each segment of the plurality of segments of the second segmented video content has a playback duration equal to a segment of the first segmented video content and corresponds to a portion of video content that is longer in duration than the video content contained in each segment of the first segmented video content;
buffering, by the video playback device, a portion of the plurality of segments of the second segmented video content as part of a first transition from the first segmented video content to the second segmented video content, wherein at least one segment of the second segmented video content comprises a plurality of consecutive sequences of video frames of the video content;
initiating playback of a first video segment of the second segmented video content; and
after receiving a request to stop the trick play and based on the file indicating a mapping between a third playback time of the second segmented video content and a fourth playback time of the first segmented video content, receiving a plurality of segments of the first segmented video content;
buffering, by the video playback device, a portion of the plurality of segments of the first segmented video content as part of a second transition from the second segmented video content to the first segmented video content;
initiating playback of a second video segment of the first segmented video content, wherein the second video segment is determined based on a second playback time associated with a second video frame of the second segmented video content that is outputted during receipt of the request to stop the trick play.

17. The method of claim 16, wherein:
the first segmented video content comprises segmented normal rate video content; and
the second segmented video content comprises segmented trick play video content.

18. The method of claim 16, wherein:
the first segmented video content comprises first segmented trick play video content associated with a first playback rate; and
the second segmented video content comprises second segmented trick play video content associated with a second playback rate that is different than the first playback rate.

19. The method of claim 16, wherein:
the trick play is a rewind trick play; and
video frames of the second segmented video content are arranged in reverse order relative to the first segmented video content.

20. The method of claim 16, further comprising:
after receiving the request to start the trick play and based on the file indicating the mapping between the first playback time of the first segmented video content and the second playback time of the second segmented video content, requesting the first video segment from a video content provider; and
after receiving the request to stop the trick play and based on the file indicating the mapping between the third playback time of the second segmented video content and the fourth playback time of the first segmented video content, requesting the second video segment from the video content provider.

21. The method of claim 16, further comprising:
receiving, by the video playback device and from a content provider, the first segmented video content simultaneously with the second segmented video content.

* * * * *